(12) United States Patent
Naka

(10) Patent No.: US 11,441,569 B2
(45) Date of Patent: Sep. 13, 2022

(54) BLOWER

(71) Applicant: Makita Corporation, Anjo (JP)

(72) Inventor: Shinsuke Naka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 91 days.

(21) Appl. No.: 17/029,530

(22) Filed: Sep. 23, 2020

(65) Prior Publication Data

US 2021/0088050 A1 Mar. 25, 2021

(30) Foreign Application Priority Data

Sep. 24, 2019 (JP) .............................. JP2019-172940

(51) Int. Cl.
| | |
|---|---|
| *F04D 25/06* | (2006.01) |
| *F04D 17/16* | (2006.01) |
| *A01G 20/47* | (2018.01) |
| *F04D 25/08* | (2006.01) |
| *A47L 5/14* | (2006.01) |
| *A47L 9/28* | (2006.01) |
| *F04D 19/00* | (2006.01) |
| *F04D 29/42* | (2006.01) |
| *E01H 1/08* | (2006.01) |
| *F04D 29/52* | (2006.01) |

(52) U.S. Cl.
CPC ......... *F04D 25/0673* (2013.01); *A01G 20/47* (2018.02); *A47L 5/14* (2013.01); *A47L 9/2842* (2013.01); *E01H 1/0809* (2013.01); *F04D 17/16* (2013.01); *F04D 19/002* (2013.01); *F04D 25/084* (2013.01); *F04D 29/422* (2013.01); *F04D 29/522* (2013.01)

(58) Field of Classification Search
CPC ......... A01G 20/47; A47L 5/14; A47L 9/2842; E01H 1/0809; F04D 19/002; F04D 25/0673; F04D 25/084; F04D 29/522; F04D 29/422; F04D 17/16
See application file for complete search history.

(56) References Cited

U.S. PATENT DOCUMENTS

| | | | |
|---|---|---|---|
| 8,984,711 B2 * | 3/2015 | Ota ..................... | H01M 50/20 |
| | | | 15/405 |
| 10,375,902 B2 * | 8/2019 | Tschopp ................ | A01G 20/47 |
| 2011/0200426 A1 | 8/2011 | Takano | |

FOREIGN PATENT DOCUMENTS

JP 2011-163300 A 8/2011

\* cited by examiner

*Primary Examiner* — Peter J Bertheaud
(74) *Attorney, Agent, or Firm* — Sughrue Mion, PLLC

(57) ABSTRACT

A blower may include a plurality of batteries; a centrifugal fan configured to change a flow direction of air from a first direction extending along the rotation axis to a radially outward direction of the rotation axis; a volute casing including a discharge port and configured to guide the air from the centrifugal fan along a circumferential direction of the rotation axis to the discharge port; and a main grip disposed radially outward of the rotation axis and outside of the volute casing and configured to be gripped by an operator. A central axis of the main grip may extend along a reference plane perpendicular to the rotation axis. A distance from the reference plane to a center of gravity of the blower may be less than or equal to 1.5 times a width of the main grip.

19 Claims, 16 Drawing Sheets

BLOWER

CROSS-REFERENCE TO RELATED APPLICATION

This application claims priority to Japanese Patent Application No. 2019-172940 filed on Sep. 24, 2019, the entire contents of which are hereby incorporated by reference into the present application.

TECHNICAL FIELD

The disclosure herewith relates to a blower.

BACKGROUND

Japanese Patent Application Publication No. 2011-163300 describes a blower. The blower comprises one battery, a motor, a fan, a volute casing, and a grip. The motor operates by electric power supplied from the battery. The fan rotates about a rotation axis extending in an up-down direction by being driven by the motor and changes a flow direction of air from an upper direction to a radially outward direction of the rotation axis. The volute casing includes a discharge port and guides the air from the centrifugal fan along a circumferential direction of the rotation axis to the discharge port. The grip is disposed on the rotation axis and outside of the volute casing.

SUMMARY

The above blower uses one battery. Due to this, the blower may have insufficiency in its output or operating time. If a capacity of the battery is increased so as to resolve the insufficiency in the output or operating time of the blower, the size of the battery is increased, which may result in unstable posture of the blower when the blower is held. The disclosure herein discloses art to suppress insufficiency in output or operating time of a blower and suppress the blower from losing stabile posture when the blower is held.

The disclosure herein discloses a blower. The blower may comprise a plurality of batteries, a motor, a centrifugal fan, a volute casing, and a main grip. The motor may be configured to operate by electric power supplied from the plurality of batteries. The centrifugal fan may be configured to rotate about a rotation axis by being driven by the motor and configured to change a flow direction of air from a first direction extending along the rotation axis to a radially outward direction of the rotation axis. The volute casing may include a discharge port and be configured to guide the air from the centrifugal fan along a circumferential direction of the rotation axis to the discharge port. The main grip may be disposed radially outward of the rotation axis and outside of the volute casing and be configured to be gripped by an operator. A central axis of the main grip may extend along a reference plane perpendicular to the rotation axis. A distance from the reference plane to a center of gravity of the blower may be less than or equal to 1.5 times a width of the main grip. Here, the center of gravity of the blower refers to a center of gravity of the blower with the plurality of batteries attached to the volute casing but other accessories, such as an air pipe for supplying air from the volute casing and a suction pipe for suctioning the air into the volute casing, not attached to the volute casing.

In the above configuration, the electric power is supplied to the motor by the plurality of batteries. Due to this, insufficiency in output or operating time of the blower can be suppressed. Further, since the distance from the reference plane to the center of gravity of the blower is less than or equal to 1.5 times the width of the main grip, the center of gravity of the blower is disposed close to the reference plane. Further, even when the accessories such as the air pipe and the suction pipe are attached to the volute casing, the center of gravity is not displaced away from the reference plane. Due to this, tilting of the blower can be suppressed when the operator holds the blower by gripping the main grip. As a result, the posture of the blower can be stabilized.

DETAILED DESCRIPTION

Figure 1:
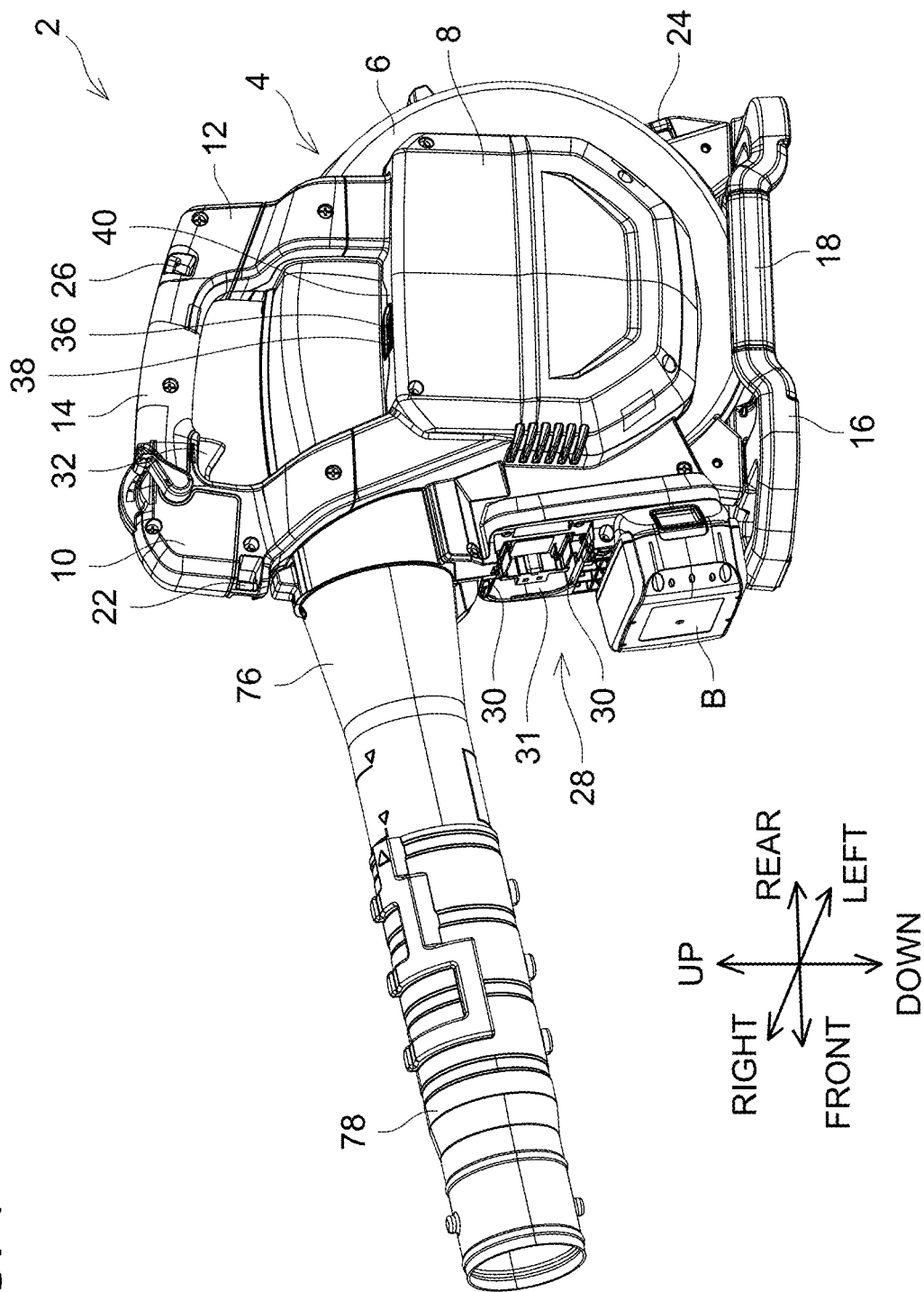
FIG. 1 is a perspective view of a blower 2 of a first embodiment in an air supplying mode.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved blowers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a blower may comprise a plurality of batteries, a motor, a centrifugal fan, a volute casing, and a main grip. The motor may be configured to operate by electric power supplied from the plurality of batteries. The centrifugal fan may be configured to rotate about a rotation axis by being driven by the motor and configured to change a flow direction of air from a first direction extending along the rotation axis to a radially outward direction of the rotation axis. The volute casing may include a discharge port and configured to guide the air from the centrifugal fan along a circumferential direction of the rotation axis to the discharge port. The main grip disposed radially outward of the rotation axis and outside of the volute casing and configured to be gripped by an operator. A central axis of the main grip extends along a reference plane perpendicular to the rotation axis. A distance from the reference plane to a center of gravity of the blower is less than or equal to 1.5 times a width of the main grip. Here, the center of gravity of the blower refers to a center of gravity of the blower with the plurality of batteries attached to the volute casing but other accessories, such as an air pipe for supplying air from the volute casing and a suction pipe for suctioning the air into the volute casing, not attached to the volute casing.

In the above configuration, the electric power is supplied to the motor by the plurality of batteries. Due to this, insufficiency in output or operating time of the blower can be suppressed. Further, since the distance from the reference plane to the center of gravity of the blower is less than or equal to 1.5 times the width of the main grip, the center of gravity of the blower is disposed close to the reference plane. Further, even when the accessories such as the air pipe and the suction pipe are attached to the volute casing, the center of gravity is not displaced away from the reference plane. Due to this, tilting of the blower can be suppressed when the operator holds the blower by gripping the main grip. As a result, the posture of the blower can be stabilized.

In one or more embodiments, when the blower is viewed along the rotation axis, the center of gravity of the blower may be disposed on a discharge port side relative to the main grip.

In the above configuration, the blower is tilted in a direction along which the discharge port faces a ground surface when the operator holds the blower by gripping the main grip, regardless of the accessories such as the air pipe and the suction pipe being attached to the volute casing or not. Due to this, the air can easily be blown onto the ground surface.

In one or more embodiments, a distance from the reference plane to a center of gravity of each of the plurality of batteries may be less than or equal to 1.5 times the width of the main grip.

In the above configuration, a position of the center of gravity of the blower can be suppressed from changing due to a change in the number of the batteries. Due to this, the posture of the blower can be stabilized when the operator holds the blower by gripping the main grip.

In one or more embodiments, when the blower is viewed along the rotation axis, the center of gravity of each of the plurality of batteries may be disposed on a discharge port side relative to the main grip.

In the above configuration, the weight of the plurality of batteries allows the center of gravity of the blower to be disposed on the discharge port side relative to the main grip. Due to this, the discharge port of the blower is tilted in the direction along which the discharge port faces the ground surface when the operator holds the blower by gripping the main grip. Due to this, the air can easily be blown onto the ground surface.

In one or more embodiments, with respect to a direction in which the central axis extends, one end of the main grip may be disposed on a discharge port side relative to another end of the main grip. When the blower is viewed along the rotation axis, a center of gravity of the motor may be disposed on the other end side relative to the one end of the main grip and on a one end side relative to the other end of the main grip.

In general, the motor is one of heavy-weight components among components constituting the blower. Due to this, the position of the center of gravity of the blower changes significantly according to a position where the motor is disposed. In the above configuration, in viewing the blower along the rotation axis, the center of gravity of the blower can be suppressed from being displaced far to the discharge port from the one end of the main grip. Due to this, the posture of the blower can be stabilized when the operator holds the blower by gripping the main grip.

In one or more embodiments, the blower may further comprise a base member fixed to the volute casing. In a state where the blower is placed on a placement plane, only the base member may be in contact with the placement plane.

In the above configuration, the base member enables the blower to be placed stably on the placement plane.

In one or more embodiments, the base member may comprise a sub grip disposed radially outward of the rotation axis and configured to be gripped by the operator. When the blower is viewed along the rotation axis, the center of gravity of the blower may be disposed between the main grip and the sub grip.

When the operator holds the blower so that the rotation axis becomes perpendicular to the placement plane such as the ground surface, the above configuration enables the operator to stably hold the blower by gripping the main grip and the sub grip.

In one or more embodiments, the volute casing may further include a suction port configured to supply air from outside of the blower into the volute casing. The air flows through the suction port in the first direction. The plurality of batteries may be attached to the volute casing by being slid in a second direction that is opposite to the first direction and may be detached from the volute casing by being slid in the first direction.

In the above configuration, when the operator holds the blower by gripping the main grip and the sub grip so that the suction port of the volute casing faces the ground surface, the second direction is oriented toward the ground surface and the first direction is oriented opposite to the ground surface. Since the batteries are detached from the volute casing by being slid in the first direction, the above configuration suppresses detachment of the plurality of batteries from the volute casing due to gravity acting on the batteries.

In one or more embodiments, the batteries may be electrically connected in series.

The above configuration increases output of the blower.

In one or more embodiments, the batteries may be electrically connected in parallel.

The above configuration prolongs operating time of the blower.

In one or more embodiments, a blower may comprise a prime mover, a fan, a casing, a dust bag, and a harness. The fan may be configured to rotate about a rotation axis by operation of the prime mover. The casing may include a suction port and a discharge port and may be configured to supply air from the suction port toward the discharge port by rotation of the fan. The garbage bag may be disposed downstream of the discharge port in an airflow direction and may be configured to collect garbage flowing with the air. The harness may be configured to be worn over shoulder(s) of an operator. The harness may be connected to a first fastener and a second fastener of the casing and a third fastener of the garbage bag.

In the above configuration, the harness is worn over the shoulder(s) of the operator while the operator is operating the blower. Further, the harness is connected to the casing and the garbage bag. Due to this, even if air flows into the garbage bag while the operator is operating the blower, the garbage bag can be suppressed from moving around.

In one or more embodiments, the harness may comprise a belt, a first connector, a second connector, and a third connector. The first connector may be disposed at one end of the belt in a longitudinal direction of the belt. The second connector may be disposed at another end of the belt in the longitudinal direction. The third connector may be disposed between the first and second connectors in the longitudinal direction. The first connector may be connected to the first fastener. The second connector may be connected to the second fastener. The third connector may be connected to the third fastener.

In the above configuration, the casing is connected to both ends of the harness in the longitudinal direction and the garbage bag is connected to a position between the both ends of the harness. Due to this, the garbage bag can further be suppressed from moving around even if the air flows into the garbage bag while the operator is operating the blower.

In one or more embodiments, when the blower is viewed along the rotation axis, the first fastener and the second fastener may be disposed at diagonal positions on the casing.

In the above configuration, while garbage is collected in the garbage bag, the blower is held such that a direction of the rotation axis matches a vertical direction. The above configuration enables the harness to stably hold the blower.

In one or more embodiments, when the blower is viewed along the rotation axis, a distance from a virtual surface passing through the first and second fasteners to a center of gravity of the blower may be less than or equal to 0.4 times a distance between the first fastener and the second fastener.

In the above configuration, while garbage is collected in the garbage bag, the blower is held such that the direction of the rotation axis matches the vertical direction. The above configuration suppresses the casing from rotating about a virtual line passing through the first and second fasteners. Due to this, the blower can stably be held by the harness.

In one or more embodiments, the third fastener may be disposed on a downstream side of the garbage bag in the airflow direction.

In the above configuration, when the third fastener is connected to the harness, the downstream side of the garbage bag in the airflow direction is fixed to the harness. Due to this, the garbage bag can further be suppressed from moving around when the air flows into the garbage bag.

In one or more embodiments, the blower may further comprise a flexible pipe disposed between the discharge port and the garbage bag in the airflow direction.

The above configuration enables the operator to freely deflect the flexible pipe. Due to this, the operator can freely change a position of the garbage bag according to his/her working posture.

In one or more embodiments, the garbage bag may include an air relief positioned on the downstream side of the garbage bag in the airflow direction. The air relief may be configured to allow the air in the garbage bag to escape to outside.

In the above configuration, the air having flowed into the garbage bag flows from an upstream side of the garbage bag to the downstream side thereof, and flows out of the garbage bag from the air relief. Due to this, excessive expansion of the garbage bag can be suppressed, and garbage flowing with the air to the garbage bag can efficiently be collected.

In one or more embodiments, the fan may be a centrifugal fan configured to change a flow direction of the air from a first direction extending along the rotation axis to a radially outward direction of the rotation axis.

In the above configuration, the air can be fed out in a direction different from an air suctioning direction.

In one or more embodiments, the blower may be a handheld blower.

The above configuration improves handling of the blower by the operator.

In one or more embodiments, the prime mover may be a motor configured to operate by electric power supplied from a power source.

In the above configuration, vibration is small as compared to a configuration in which the prime mover is an engine. Due to this, the above configuration suppresses vibration transmitted to the operator through the harness while the operator is operating the blower.

In one or more embodiments, the power source may be a plurality of batteries attachable to the casing.

In the above configuration, the blower can be used in work areas where an external power source does not exist.

First Embodiment

A blower 2 of a first embodiment will be described with reference to FIGS. 1 to 10. The blower 2 is a handheld blower. The blower 2 can operate in an air supplying mode and an air suctioning mode. When the blower 2 is in the air supplying mode, the blower 2 can blow off fallen leaves and the like on a ground surface. When the blower 2 is in the air suctioning mode, the blower 2 can suction and collect the fallen leaves and the like on the ground surface. Hereinbelow, a direction along which a rotation axis AX of a motor 54 (to be described later) extends will be termed a right-left direction, a direction perpendicular to the right-left direction will be termed a front-rear direction, and a direction perpendicular to the right-left direction and the front-rear direction will be termed an up-down direction.

FIGS. 1 to 8 show a configuration of the blower 2 which is used in the air supplying mode. As shown in FIG. 1, the blower 2 comprises a casing 4 and a plurality of (two in the present embodiment) batteries B. In FIG. 1, one of the batteries B is omitted for clearer view of battery mounting portions 28 to be described later. The casing 4 comprises a main casing 6, a side casing 8, a front connecting section 10, a rear connecting section 12, a main grip 14, and a base member 16. The main casing 6 is configured as a volute casing. The side casing 8 is fixed to a left side surface of the main casing 6 with screws.

The front connecting section 10 extends upward from a front upper portion of the main casing 6. The rear connecting section 12 extends upward from a rear upper portion of the main casing 6. The main grip 14 extends between a rear upper portion of the front connecting section 10 and a front upper portion of the rear connecting section 12. That is, a front end of the main grip 14 is connected to the rear upper portion of the front connecting section 10, and a rear end of the main grip 14 is connected to the front upper portion of the rear connecting section 12. The main grip 14 is disposed above the main casing 6. The main grip 14 is configured to be gripped by an operator. The base member 16 is fixed to a lower portion of the main casing 6. A configuration of the base member 16 will be described later in detail.

The casing 4 includes a front fastener (first fastener) 22, a lower fastener (second fastener) 24, and a rear fastener 26. The front fastener 22 is disposed at a front lower portion of the front connecting section 10. The lower fastener 24 is disposed at a rear lower portion of the main casing 6. The rear fastener 26 is disposed at an upper portion of the rear connecting section 12. In a view of the blower 2 along the left direction (or the right direction), the front fastener 22 and the lower fastener 24 are disposed at diagonal positions on the casing 4.

A plurality of (two in the present embodiment) battery mounting portions 28 is disposed on a front surface of the main casing 6. The two battery mounting portions 28 are electrically connected in series. In a variant, the two battery mounting portions 28 may be electrically connected in parallel. Each of the two batteries B is to be detachably attached to corresponding one of the two battery mounting portions 28. The batteries B may, for example, be lithium ion batteries.

Each of the battery mounting portions 28 comprises a pair of rails 30 and a wall 31. The rails 30 are separated from each other in the up-down direction. The pair of rails 30 extends in the right-left direction. The wall 31 extends from a right end of one of the rails 30 to a right end of the other of the rails 30. The battery B is attached to the battery mounting portion 28 by sliding the battery B rightward until it abuts the wall 31. Further, the battery B is detached from the battery mounting portion 28 by sliding the battery B leftward.

A trigger 32 is attached to the main grip 14. The trigger 32 is configured to be pressed in by finger(s) of a hand of the operator gripping the main grip 14.

The blower 2 further comprises a main power switch 36 and a display panel 38. The main power switch 36 and the display panel 38 are disposed on a middle surface 40 defined by the side casing 8 and the main casing 6. The middle surface 40 is oriented upward. The middle surface 40 is disposed below and left to the main grip 14. The main power switch 36 is configured to be operated by the hand of the operator different from the hand gripping the main grip 14. Due to this, the main power switch 36 can be suppressed from being erroneously operated by the hand gripping the main grip 14. The main power switch 36 is a switch for switching the blower 2 between an off state and an on state.

When the blower 2 is in the off state, operation of the motor 54 (to be described later) is prohibited. Thus, the motor 54 does not operate even when the trigger 32 is pressed in. On the other hand, when the blower 2 is in the on state, the operation of the motor 54 is allowed. Thus, the motor 54 operates when the trigger 32 is pressed in. The display panel 38 displays a display regarding a state of the blower 2, for example, displays a display indicating that the blower 2 is in the on state when the blower 2 is in the on state. The display panel 38 may, for example, be a LED panel. In a variant, the display panel 38 may be configured to light up when the blower 2 is in the on state.

Figure 2:
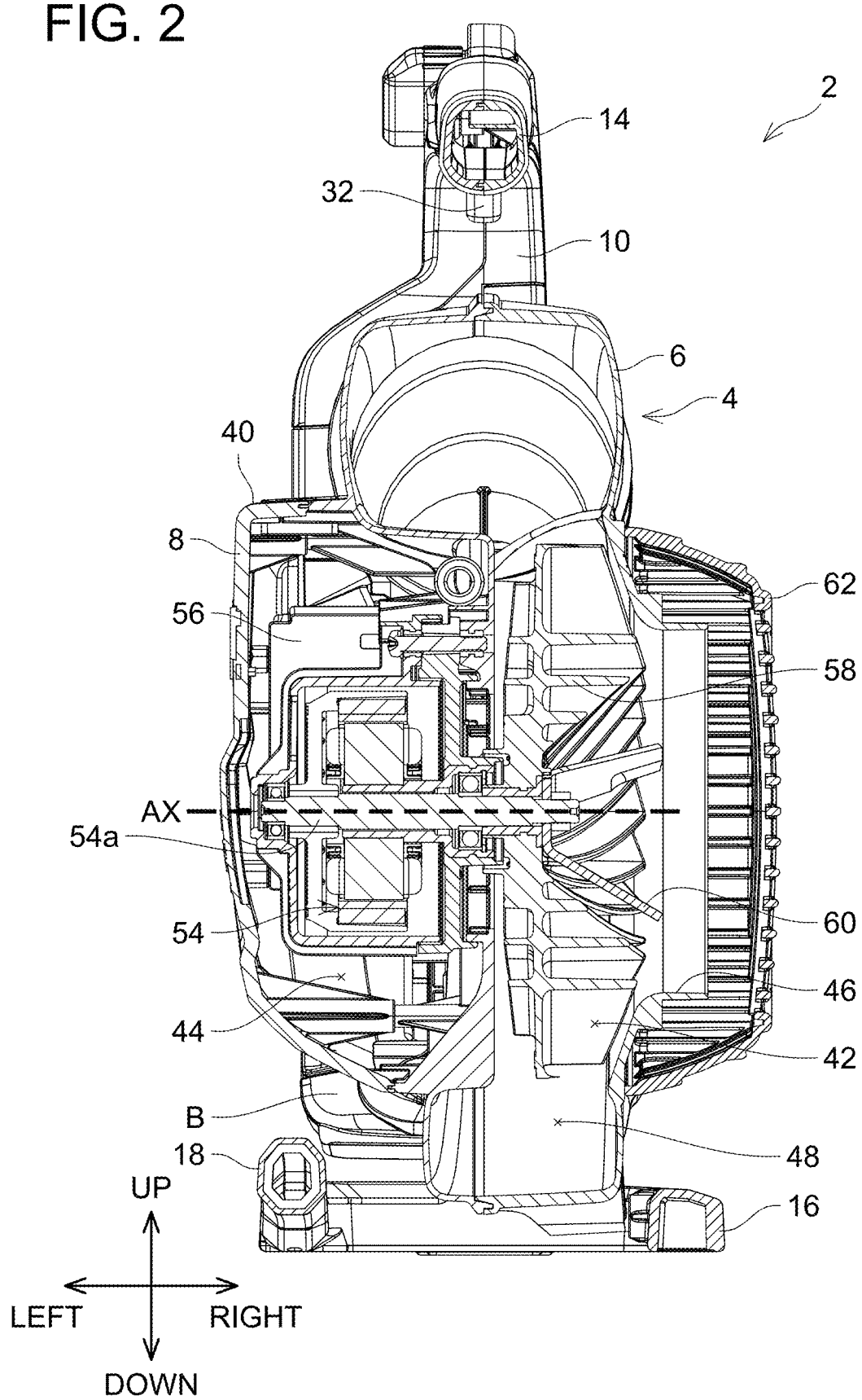
FIG. 2 is a cross-sectional view of the blower 2 of the first embodiment in the air supplying mode in a vicinity of a motor 54.
Figure 3:
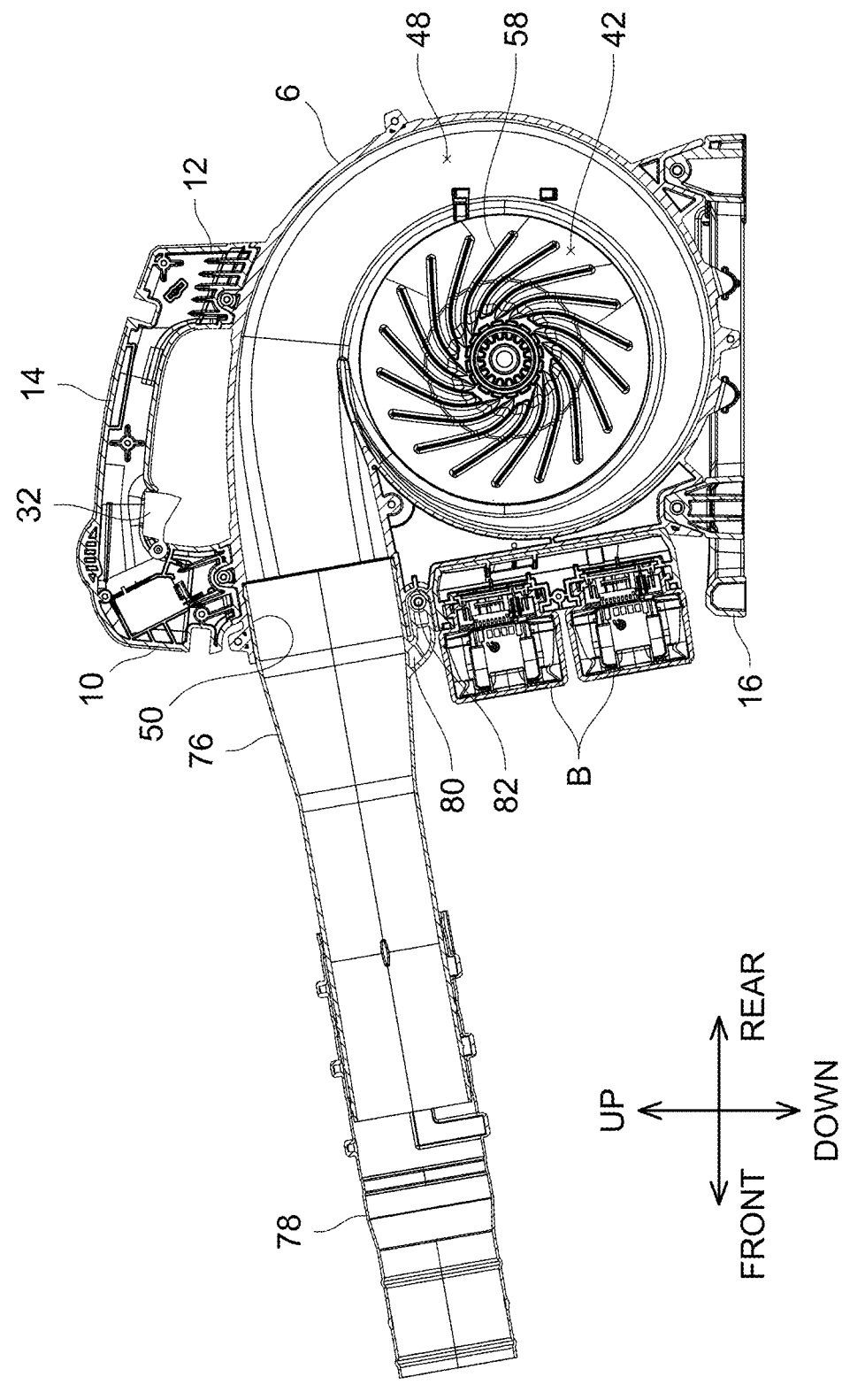
FIG. 3 is a cross-sectional view of the whole blower 2 of the first embodiment in the air supplying mode.

As shown in FIG. 2, the casing 4 includes a first accommodating chamber 42, a second accommodating chamber 44, a suction port 46, an air passage 48, and a discharge port 50 (see FIG. 3). The first accommodating chamber 42 is defined inside the main casing 6. The second accommodating chamber 44 is defined by the main casing 6 and the side casing 8. The second accommodating chamber 44 is disposed on a left side to the first accommodating chamber 42. The suction port 46 is disposed on a right side surface of the main casing 6. The suction port 46 penetrates the right side surface of the main casing 6. The suction port 46 communicates with the first accommodating chamber 42. The air passage 48 communicates with the first accommodating chamber 42. As shown in FIG. 3, the air passage 48 extends spirally around an axis extending in the right-left direction. When the blower 2 is viewed along the right direction, the air passage 48 extends counterclockwise from inside toward outside. The discharge port 50 communicates with the air passage 48. The discharge port 50 is disposed on an upper portion of the front surface of the main casing 6. The discharge port 50 is disposed frontward of the front end of the main grip 14 in the front-rear direction.

As shown in FIG. 2, the blower 2 further comprises the motor 54, a control board 56, a fan 58, and blades 60. The motor 54 and the control board 56 are disposed in the second accommodating chamber 44. The motor 54 is a prime mover, for example, a brushless motor. In a variant, the motor 54 may be an engine or may be a brush motor. The motor 54 is configured to rotate about a rotation axis AX which extends in the right-left direction by electrical power supplied from the two batteries B. A shaft 54a of the motor 54 extends in the right-left direction. A right end of the shaft 54a and a portion thereof near the right end extend into the first accommodating chamber 42. The control board 56 is electrically connected to the motor 54. The control board 56 is configured to control rotation of the motor 54 according to operation on the trigger 32.

The fan 58 and the blades 60 are disposed in the first accommodating chamber 42. The fan 58 is fitted to the portion near the right end of the shaft 54a of the motor 54. The fan 58 is, for example, a centrifugal fan. In a variant, the fan 58 may be an axial fan. When the motor 54 rotates, the fan 58 rotates about the rotation axis AX. As a result, air flows into the first accommodating chamber 42 from the outside of the blower 2 through the suction port 46. The air flows through the suction port 46 leftward. After this, the flow direction of the air is changed to a radially outward direction of the rotation axis AX by the fan 58. This air is guided to the air passage 48 and flows to the discharge port 50. The blades 60 are fitted to the portion near the right end of the shaft 54a. The blades 60 are disposed on a suction port 46 side relative to the fan 58. When the motor 54 rotates, the blades 60 rotate about the rotation axis AX with the fan 58. Garbage (such as fallen leaves and pebbles) that has entered the first accommodating chamber 42 from the suction port 46 with the air is thereby broken up. Thus, damage to the fan 58 by the garbage can be suppressed.

As aforementioned, the casing 4 comprises the base member 16. The main casing 6 is interposed between the base member 16 and the main grip 14 in the up-down direction, and the base member 16 is disposed on the opposite side from the main grip 14. That is, the base member 16 and the main grip 14 are disposed outside of the main casing 6 in the radially outward direction of the rotation axis AX. In a state where the blower 2 is placed on a placement plane such as a ground surface, only the base member 16 is in contact with the placement plane. The base member 16 comprises a sub grip 18. The sub grip 18 is separated from the placement plane in the state where the blower 2 is placed on the placement plane. Due to this, when the operator is to lift the blower 2 that is placed on the placement plane, the operator can grip the main grip 14 with one hand and grip the sub grip 18 with the other hand.

Figure 4:
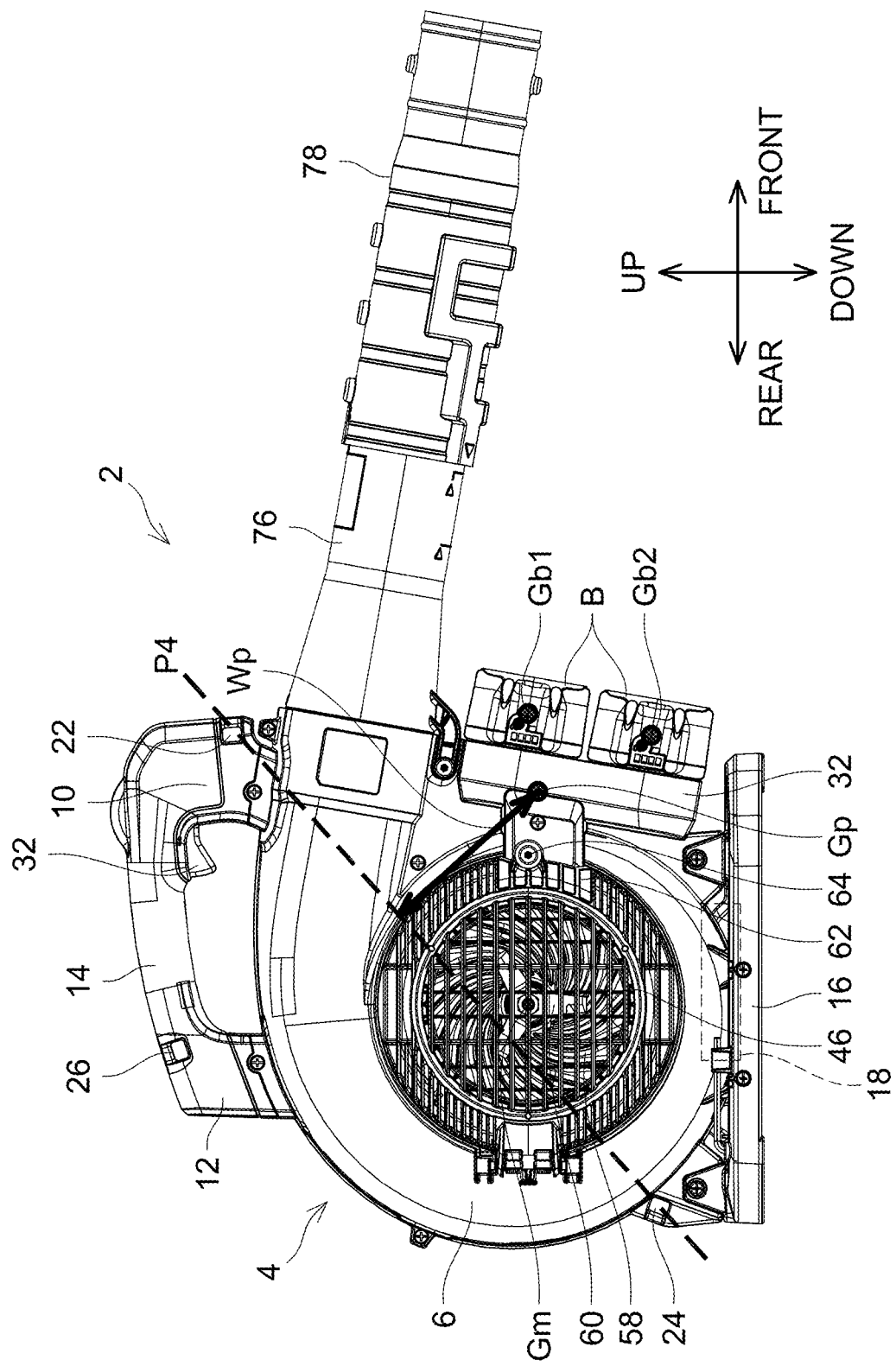
FIG. 4 is a right side view of the blower 2 of the first embodiment in the air supplying mode.
Figure 5:
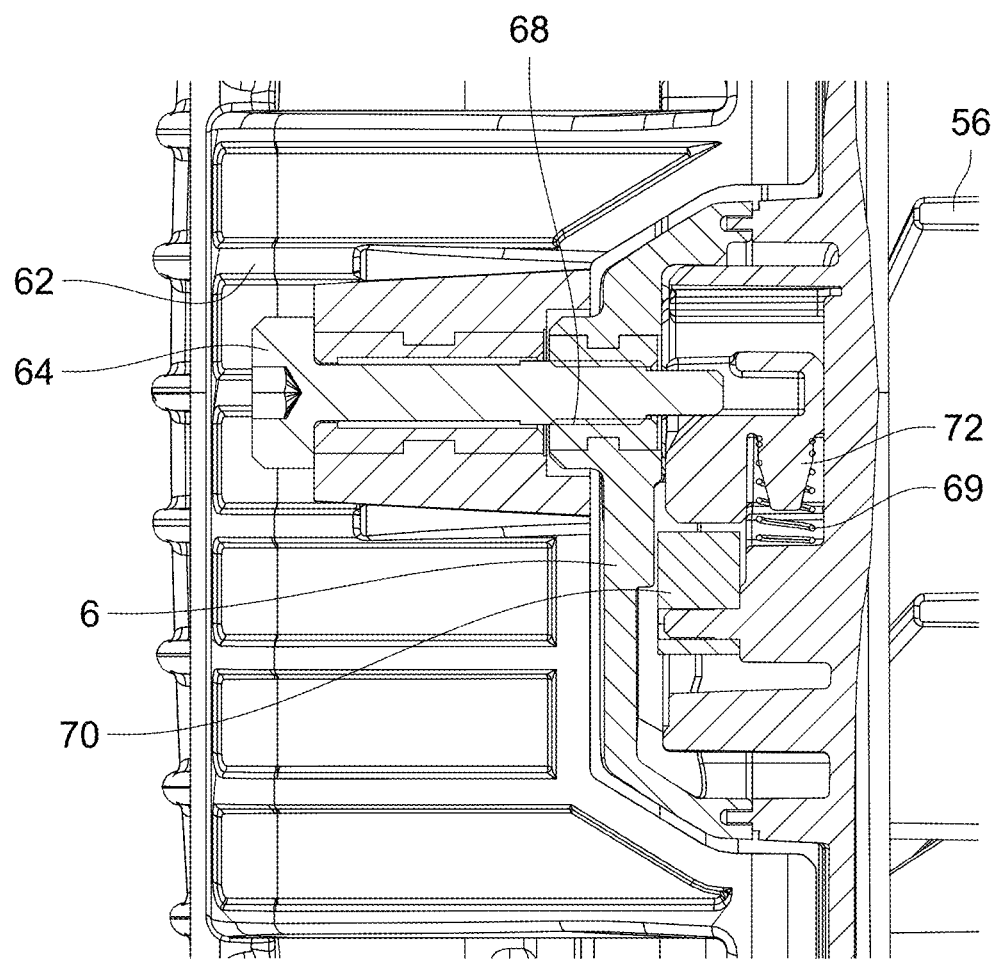
FIG. 5 is a cross-sectional view of the blower 2 of the first embodiment in the air supplying mode in a vicinity of a first opening 68.
Figure 5:
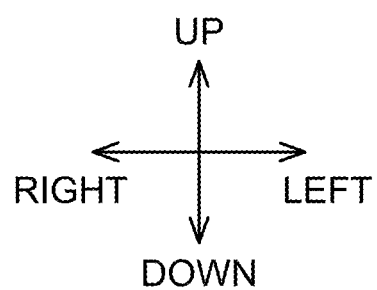

As shown in FIG. 4, the blower 2 further comprises a cover 62. Here, FIG. 4 is a diagram viewing the blower 2 along the left direction (that is, viewing the blower 2 along the rotation axis AX). The cover 62 includes a large number of small openings. The cover 62 is disposed on the right side surface of the main casing 6. One end of the cover 62 is configured to be pivotable with respect to the main casing 6 about a pivot shaft extending in the up-down direction. The cover 62 is configured to cover the suction port 46. When the one end of the cover 62 is pivoted with respect to the main casing 6 in the state where the cover 62 covers the suction port 46, the suction port 46 is opened. A first fixation pin 64 is attached to another end of the cover 62. As shown in FIG. 5, the first fixation pin 64 is inserted into a first opening 68 of the main casing 6.

The blower 2 further comprises a first sensor 70. The first sensor 70 is disposed near the first opening 68. The first sensor 70 is connected to the control board 56. The first sensor 70 is configured to detect whether or not the first fixation pin 64 is in the first opening 68. Specifically, in a case where the first fixation pin 64 is in the first opening 68, an intermediate member 72 is pressed downward and a switch (not shown) of the first sensor 70 is thereby pressed down. In this case, the first sensor 70 outputs an on-signal to the control board 56 and the control board 56 allows the motor 54 to operate. On the other hand, in a case where the first fixation pin 64 is not in the first opening 68, the intermediate member 72 is not pressed downward because it is biased upward by a spring 69, and the switch of the first sensor 70 is thereby not pressed down. In this case, the first sensor 70 outputs an off-signal to the control board 56 and the control board 56 prohibits the motor 54 from operating. Due to this, the motor 54 can be prohibited from operating when the cover 62 does not cover the suction port 46.

As shown in FIG. 3, the blower 2 further comprises a fixed pipe 76 and an air supply pipe 78. The fixed pipe 76 is inserted in the discharge port 50. The fixed pipe 76 is a cylindrical pipe extending in the longitudinal direction. The air having flowed through the discharge port 50 flows in the fixed pipe 76. The air supply pipe 78 is detachably attached to a distal end of the fixed pipe 76. The air supply pipe 78 is a cylindrical pipe extending in the longitudinal direction. The air having flowed through the discharge port 50 flows through the fixed pipe 76 and the air supply pipe 78 and then blows out from a distal opening of the air supply pipe 78. As a result, fallen leaves and the like on the ground surface are blown off.

Figure 6:
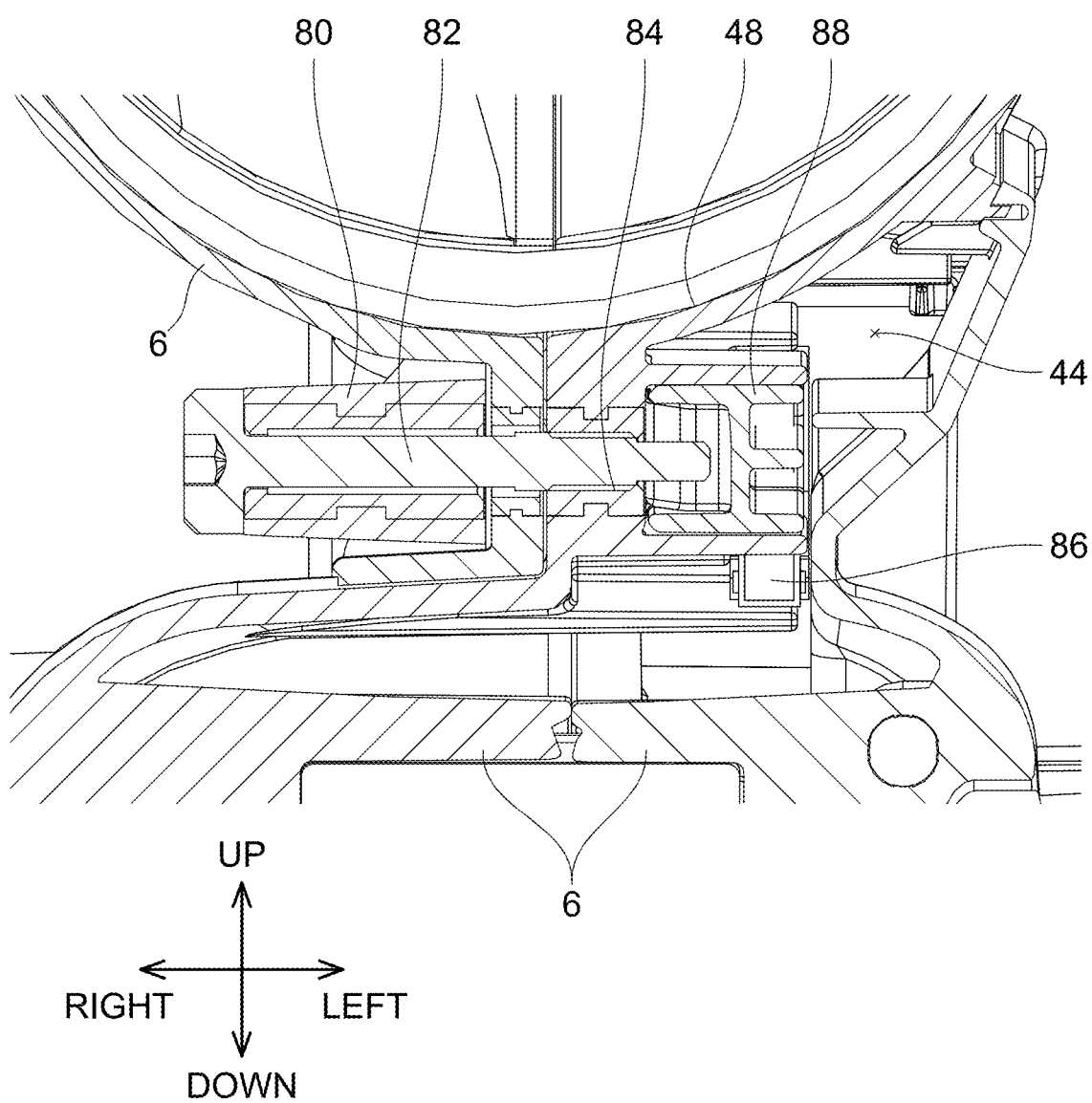
FIG. 6 is a cross-sectional view of the blower 2 of the first embodiment in the air supplying mode in a vicinity of a second opening 84.

A projection 80 is disposed at a rear lower portion of the fixed pipe 76. A second fixation pin 82 is attached to the projection 80. As shown in FIG. 6, the second fixation pin 82 is inserted into a second opening 84 of the main casing 6.

The blower 2 further comprises a second sensor 86. The second sensor 86 is disposed near the second opening 84. The second sensor 86 is connected to the control board 56. The second sensor 86 is configured to detect whether or not the second fixation pin 82 is in the second opening 84. Specifically, in a case where the second fixation pin 82 is in the second opening 84, an intermediate member 88 is pressed rearward (direction perpendicular to a sheet surface of FIG. 6) and a switch (not shown) of the second sensor 86 is thereby pressed. In this case, the second sensor 86 outputs an on-signal to the control board 56 and the control board 56 allows the motor 54 to operate. On the other hand, in a case where the second fixation pin 82 is not in the second opening 84, the intermediate member 88 is not pressed rearward because it is biased frontward by a spring (not shown), and the switch of the second sensor 86 is thereby not pressed. In this case, the second sensor 86 outputs an off-signal to the control board 56 and the control board 56 prohibits the motor 54 from operating.

Figure 7:
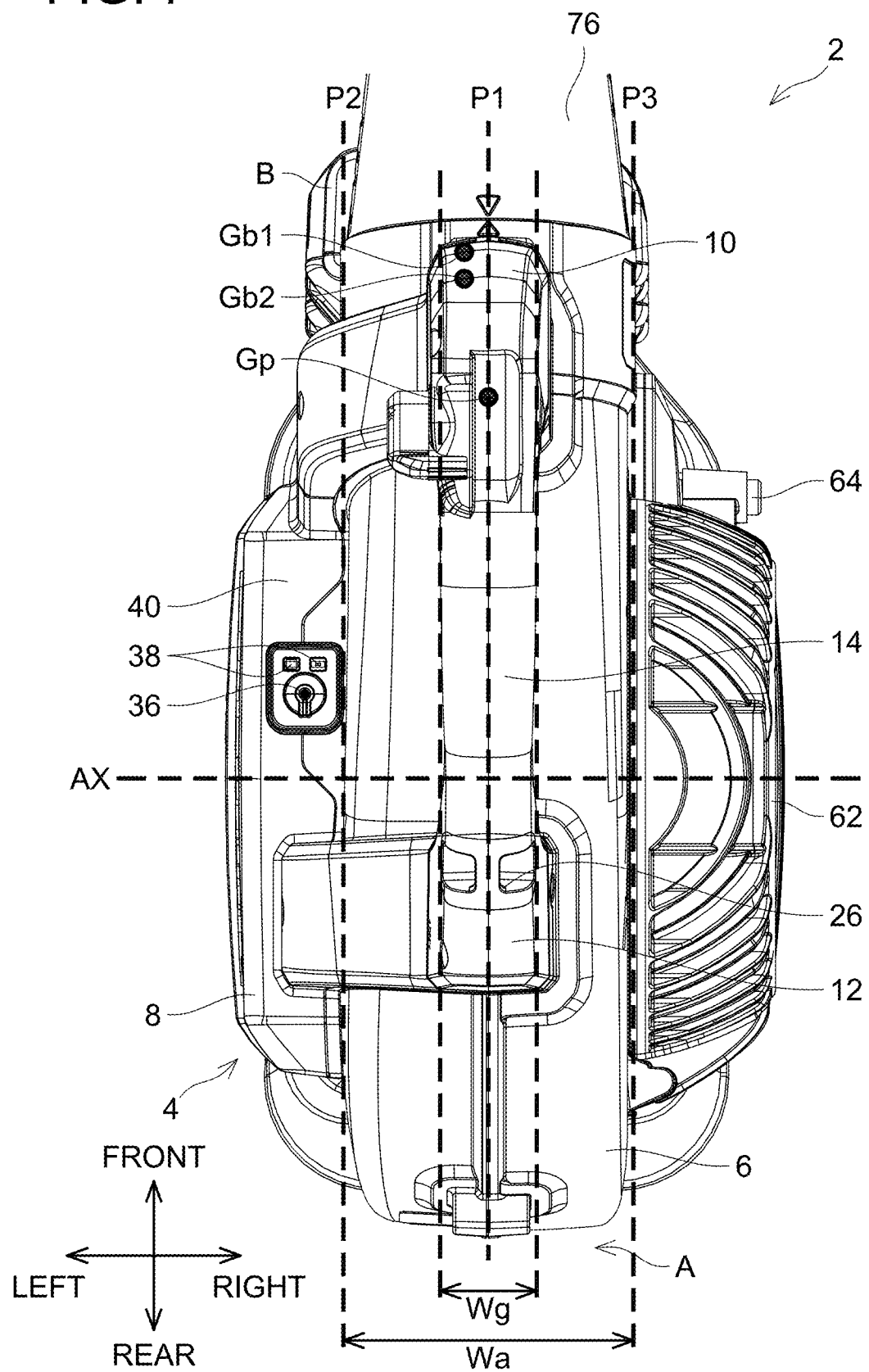
FIG. 7 is atop view of the blower 2 of the first embodiment in the air supplying mode.

As shown in FIG. 7, in the blower 2, a central axis of the main grip 14 extends in the front-rear direction along a reference plane P1 which is perpendicular to the rotation axis AX of the fan 58. In a top view of the blower 2, a center of gravity Gp of the blower 2 is disposed on the main grip 14. That is, a distance from the reference plane P1 to the center of gravity Gp of the blower 2 is less than or equal to 0.5 times a width Wg of the main grip 14. The center of gravity Gp of the blower 2 refers to a center of gravity of the blower 2 with the two batteries B attached to the main casing 6 but the fixed pipe 76 and the air supply pipe 78 not attached to the main casing 6. Further, although not shown, the center of gravity of the blower 2 is disposed on the main grip 14 even when the fixed pipe 76 and the air supply pipe 78 are attached to the main casing 6. In a variant, the center of gravity Gp of the blower 2 may be disposed in a central region A. Here, the central region A is a region between a plane P2 and a plane P3. The plane P2 extends at a position that is on a left side to the reference plane P1 and separated from the reference plane P1 by a distance of 1.5 times the width Wg of the main grip 14. The plane P3 extends at a position that is on a right side to the reference plane P1 and separated from the reference plane P1 by the distance of 1.5 times the width Wg of the main grip 14. A width Wa between the planes P2 and P3 is 3 times the width Wg of the main grip 14.

In the top view of the blower 2, centers of gravity Gb1, Gb2 of the two batteries B are disposed on the main grip 14. That is, a distance from the reference plane P1 to the center of gravity Gb1 of one of the batteries B and a distance from the reference plane P1 to the center of gravity Gb2 of the other of the batteries B is less than or equal to 0.5 times the width of the main grip 14. In a variant, the centers of gravity Gb1, Gb2 of the two batteries B may be disposed in the central region A.

As shown in FIG. 4, in the front-rear direction, the center of gravity Gp of the blower 2 and the centers of gravity Gb1, Gb2 of the two batteries B are disposed frontward of the front end of the main grip 14 (on discharge port 50 side relative to the front end of the main grip 14, the discharge port 50 is not shown). Further, although not shown, the center of gravity of the blower 2 is disposed frontward of the front end of the main grip 14 (on the discharge port 50 side relative to the front end of the main grip 14, the discharge port 50 is not shown) also when the fixed pipe 76 and the air supply pipe 78 are attached to the main casing 6. The center of gravity Gp of the blower 2 is disposed rearward of (on a main grip 14 side relative to) the discharge port 50 (not shown) and the centers of gravity Gb1, Gb2 of the two batteries B in the front-rear direction. The center of gravity Gp of the blower 2 is disposed between the main grip 14 and the sub grip 18 of the base member 16 in the up-down direction. In FIG. 4, the position of the sub grip 18 is indicated by a broken line. A center of gravity Gm of the motor 54 is disposed on a front end side of the main grip 14 relative to the rear end of the main grip 14 and on a rear end side of the main grip 14 relative to the front end of the main grip 14 in the front-rear direction. The center of gravity Gm of the motor 54 is disposed below the main grip 14. The center of gravity Gp of the blower 2, the centers of gravity Gb1, Gb2 of the two batteries B, and the center of gravity Gm of the motor 54 are disposed below a plane passing through a center between a top portion of the main grip 14 and a bottom portion of the base member 16.

In the view of the blower 2 along the left direction, the front fastener 22 and the lower fastener 24 are disposed on a virtual plane P4. Here, the virtual plane P4 is a plane which passes through the front fastener 22 and the lower fastener 24. A distance from the virtual plane P4 to the center of gravity Gp of the blower 2 is less than or equal to 0.3 times a distance between the front fastener 22 and the lower fastener 24. In a variant, the distance from the virtual plane P4 to the center of gravity Gp of the blower 2 may be less than or equal to 0.4 times the distance between the front fastener 22 and the lower fastener 24.

Figure 8:
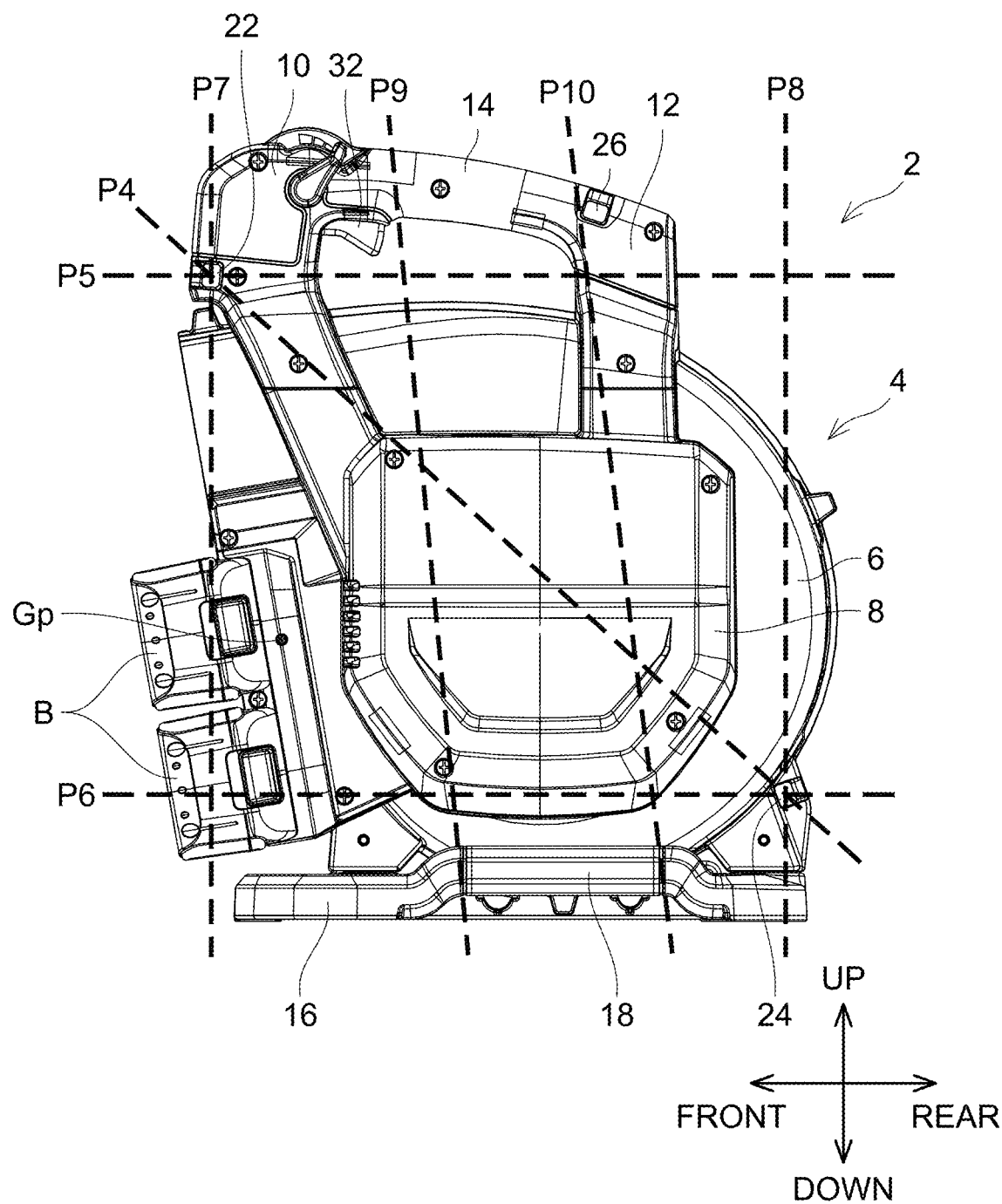
FIG. 8 is a left side view of the blower 2 of the first embodiment in the air supplying mode.

As shown in FIG. 8, in the view of the blower 2 along the right direction, the center of gravity Gp of the blower 2 is disposed between a virtual plane P5 and a virtual plane P6 in the up-down direction. Here, the virtual plane P5 is a plane perpendicular to the up-down direction and passing through the front fastener 22, and the virtual plane P6 is a plane perpendicular to the up-down direction and passing through the lower fastener 24. Further, in the view of the blower 2 along the left direction, the center of gravity Gp of the blower 2 is disposed between a virtual plane P7 and a virtual plane P8 in the front-rear direction. Here, the virtual plane P7 is a plane perpendicular to the front-rear direction and passing through the front fastener 22, and the virtual plane P8 is a plane perpendicular to the front-rear direction and passing through the lower fastener 24. When viewed along the right-left direction, the center of gravity Gp of the blower 2 is disposed in a region defined by the virtual planes P5, P6, P7, and P8.

In the view of the blower 2 along the left direction, the virtual plane P4 intersects both a virtual plane P9 and a virtual plane P10 between the front fastener 22 and the lower fastener 24. Here, the virtual plane P9 is a plane passing through a rear end of the trigger 32 attached to the main grip 14 and a front end of the sub grip 18, and the virtual plane P10 is a plane passing through the rear end of the main grip 14 and a rear end of the sub grip 18.

Figure 9:
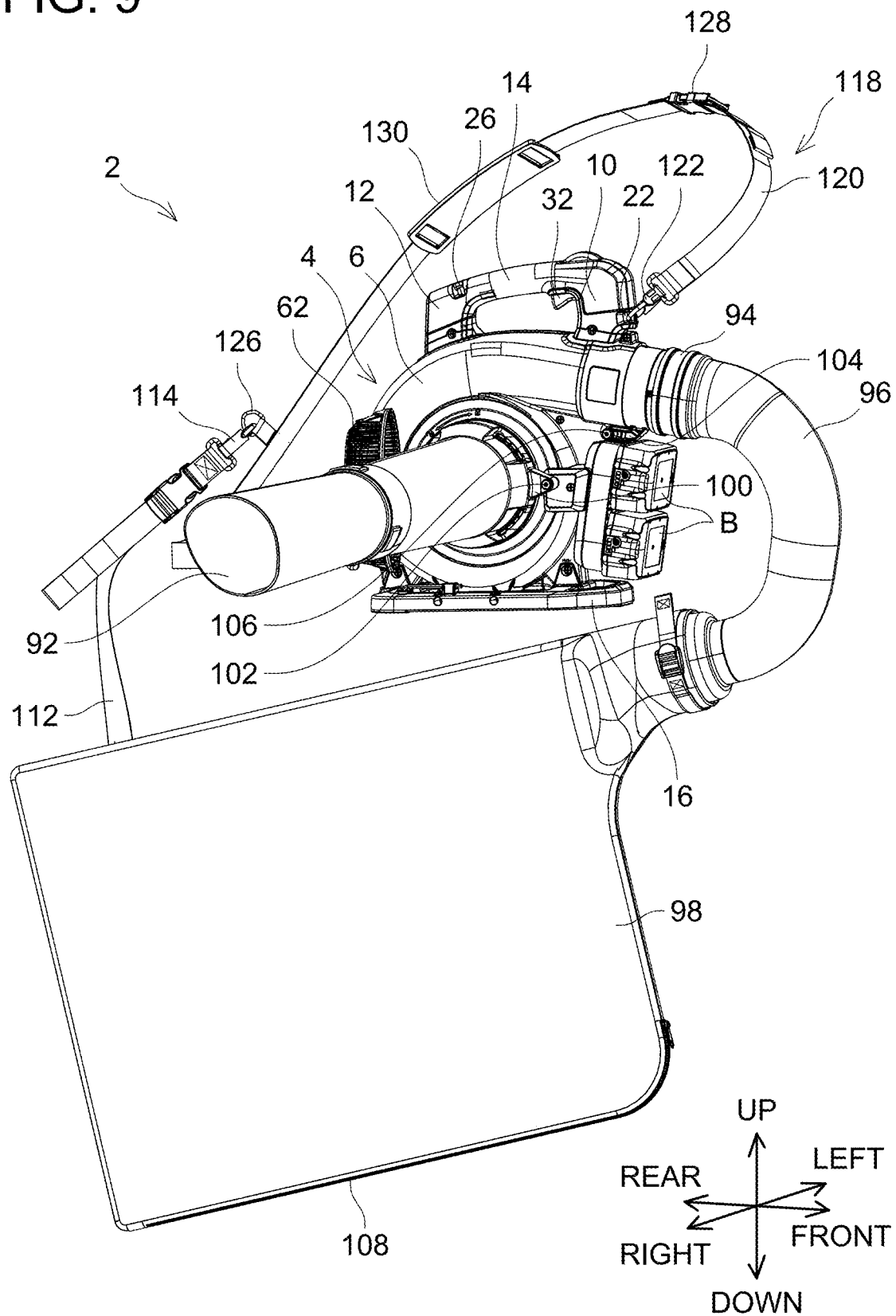
FIG. 9 is a perspective view of the blower 2 of the first embodiment in an air suctioning mode of the first embodiment.

Next, the configuration of the blower 2 used in the air suctioning mode will be described with reference to FIGS. 9 and 10. A part of the constituent components of the blower 2 used in the air suctioning mode differs from a part of the constituent components of the blower 2 used in the air supplying mode. As shown in FIG. 9, the blower 2 comprises a suction pipe 92, a joint 94, a flexible pipe 96, and a garbage bag 98, instead of the fixed pipe 76 and the air supply pipe 78. The suction pipe 92 is attached to the main casing 6 on a periphery of the suction port 46 (not shown in FIG. 9) with the cover 62 opened. The suction pipe 92 is a cylindrical pipe extending in the longitudinal direction. Although not shown, a third fixation pin 102 attached to a projection 100 of the suction pipe 92 is inserted into the first opening 68 of the main casing 6. Further, although not shown, the center of gravity of the blower 2 with the suction pipe 92 attached to the main casing 6 is disposed on the main grip 14 in the top view of the blower 2, and further, it is disposed frontward of the front end of the main grip 14 (on the discharge port 50 side relative to the front end of the main grip 14) in the view of the blower 2 along the rotation axis AX.

The joint 94 is inserted in the discharge port 50. The joint 94 is a cylindrical pipe. Although not shown, a fourth fixation pin 106 attached to a projection 104 of the joint 94 is inserted in the second opening 84 of the main casing 6.

One end of the flexible pipe 96 is attached to a distal end of the joint 94. The flexible pipe 96 is a cylindrical pipe. The flexible pipe 96 is configured to be pivotable along a circumferential direction of an outer circumferential surface of the joint 94. The flexible pipe 96 is configured to deflect.

The garbage bag 98 is attached to another end of the flexible pipe 96. That is, in an airflow direction, the garbage bag 98 is disposed downstream of the discharge port 50, the joint 94, and the flexible pipe 96. The garbage bag 98 is constituted of fabric. The fabric is in a single layer on one surface of the garbage bag 98 and is in double layers on another surface of the garbage bag 98. A zipper 108 is disposed at a lower portion of the garbage bag 98. The garbage bag 98 opens when the zipper 108 is opened, and the garbage bag 98 closes when the zipper 108 is closed. An air relief 110 is disposed on an end of the garbage bag 98 that is opposite from the end thereof where the flexible pipe 96 is attached. The air relief 110 is located on a downstream side of the garbage bag 98 in the airflow direction. The air relief 110 is configured to allow air in the garbage bag 98 to escape to the outside. A harness fastener 114 (third fastener) is attached to an end of the garbage bag opposite from the zipper 108 via a band 112. In a variant, the harness fastener 114 may be attached to the other end of the garbage bag 98 without the band 112 interposed therebetween. The harness fastener 114 may, for example, be a carabiner.

The blower 2 further comprises a harness 118. The harness 118 comprises a belt 120, a first connector 122, a second connector 124, a third connector 126, a length adjuster 128, and a pad 130. The belt 120 extends in the longitudinal direction. The first connector 122 is attached to one end of the belt 120 in the longitudinal direction. The second connector 124 is attached to another end of the belt 120 in the longitudinal direction. The first connector 122 and the second connector 124 may, for example, be carabiners. Each of the first connector 122 and the second connector 124 is configured to connect with one of the front fastener 22, the lower fastener 24, and the rear fastener 26 of the casing 4. The third connector 126 is disposed between the one end and the other end of the belt 120. The third connector 126 may, for example, be a ring. The third connector 126 is configured to connect with the harness fastener 114. The length adjuster 128 and the pad 130 are disposed at arbitrary positions between one end and the other end of the belt 120 in the longitudinal direction. The length adjuster 128 is a member configured to adjust a length of the belt 120. The pad 130 is disposed between the belt 120 and a shoulder of the operator when the belt 120 is worn over the shoulder of the operator.

Figure 10:
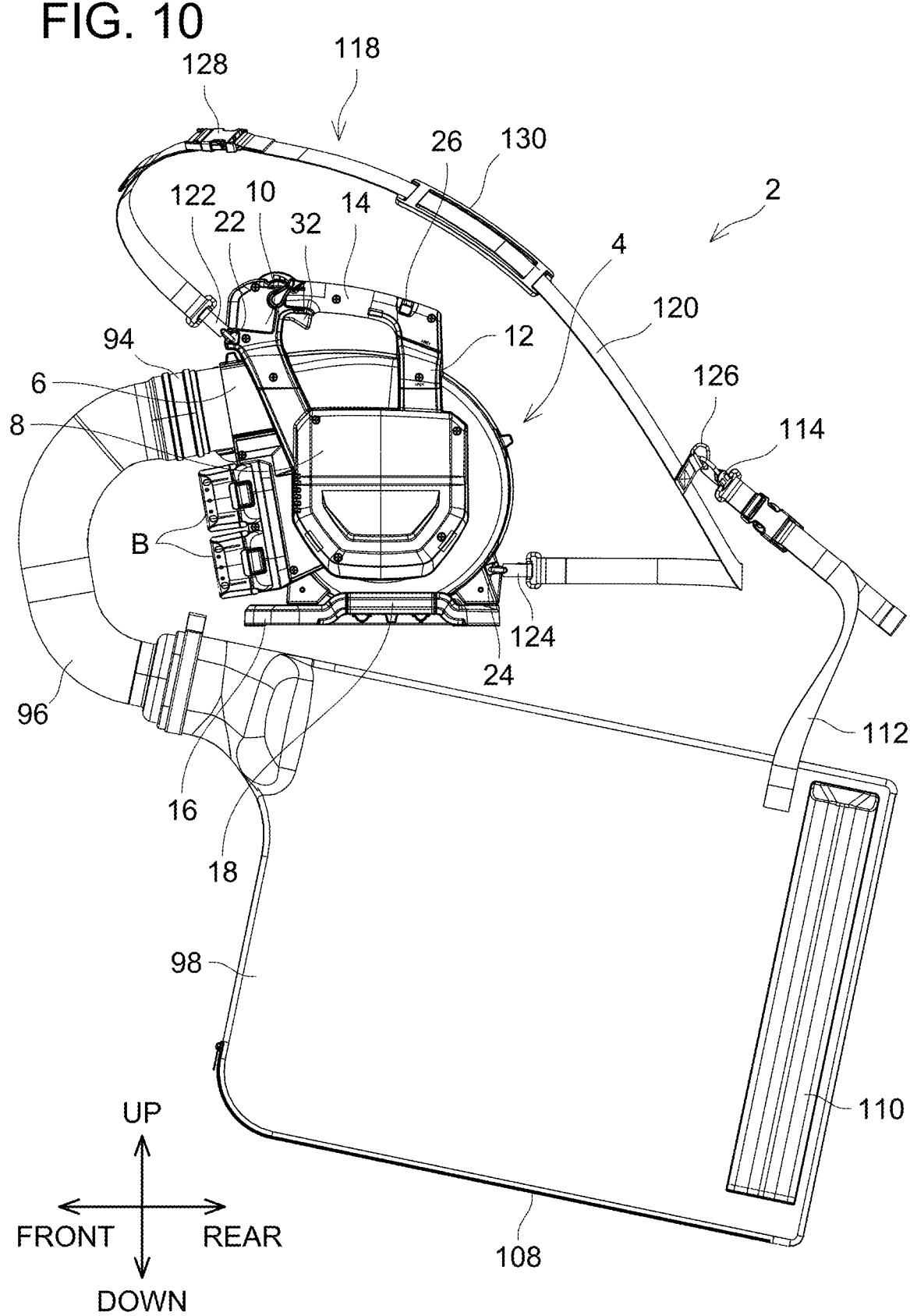
FIG. 10 is a left side view of the blower 2 of the first embodiment in the air suctioning mode of the first embodiment.

For performing a suction operation using the blower 2, as shown in FIG. 10, the first connector 122 of the harness 118 is connected to the front fastener 22 of the casing 4. Further, the second connector 124 of the harness 118 is connected to the lower fastener 24 of the casing 4. Further, the harness fastener 114 is connected to the third connector 126 of the harness 118.

For performing the suction operation using the blower 2, the main grip 14 and the sub grip 18 of the base member 16 are gripped by the operator, and the belt 120 of the harness 118 is worn over the shoulder of the operator. The other surface of the garbage bag 98 with the fabric doubled layers faces the operator. Further, the zipper 108 of the garbage bag 98 faces downward (that is, toward the ground surface). When the trigger 32 is pushed by the operator while the blower 2 is in the on state due to the main power switch 36 having been operated, the motor 54 operates and the fan 58 rotates thereby. From this state, when the distal end of the suction pipe 92 is brought to face the ground surface, fallen leaves on the ground surface enter the suction pipe 92, pass through the suction port 46, the first accommodating chamber 42, the air passage 48, the discharge port 50, the joint 94, and the flexible pipe 96 in this order, and then are collected into the garbage bag 98. The fallen leaves are broken up by the blades 60. The air having flowed into the garbage bag 98 with the fallen leaves flows out from the air relief 110 of the garbage bag 98.

In one or more embodiments, the blower 2 comprises the two batteries B, the motor 54, the fan 58, the main casing 6, and the main grip 14. The motor 54 may be configured to operate by electric power supplied from the plurality of batteries. The fan 58 may be configured to rotate about the rotation axis AX by being driven by the motor 54 and configured to change the flow direction of air from the left direction extending along the rotation axis AX to the radially outward direction of the rotation axis AX. As shown in FIG. 3, the main casing 6 includes the discharge port 50 and configured to guide the air from the fan 58 along a circumferential direction of the rotation axis AX to the discharge port 50. The main grip 14 may be disposed radially outward of the rotation axis AX and outside of the main casing 6 and configured to be gripped by the operator. The central axis of the main grip 14 may extend along the reference plane P1 perpendicular to the rotation axis AX. As shown in FIG. 7, the distance from the reference plane P1 to the center of gravity Gp of the blower 2 is less than or equal to 1.5 times the width Wg of the main grip 14. In the above configuration, the electric power is supplied to the motor 54 by the plurality of batteries B. Due to this, insufficiency in output or operating time of the blower 2 can be suppressed. Further, since the distance from the reference plane P1 to the center of gravity Gp of the blower 2 is less than or equal to 1.5 times the width Wg of the main grip 14, the center of gravity Gp of the blower 2 is disposed close to the reference plane P1. Further, even when the fixed pipe 76 and the air supply pipe 78 are attached to the main casing 6, the center of gravity of the blower 2 is not displaced away from the reference plane P1. Due to this, tilting of the blower 2 can be suppressed when the operator holds the blower 2 by gripping the main grip 14. As a result, the posture of the blower 2 can be stabilized.

As shown in FIG. 4, when the blower 2 is viewed along the rotation axis AX, the center of gravity Gp of the blower 2 is disposed on the discharge port 50 side relative to the main grip 14. In the above configuration, the blower 2 is tilted in the direction along which the discharge port 50 faces a ground surface when the operator holds the blower 2 by gripping the main grip 14, regardless of the fixed pipe 76 and the air supply pipe 78 being attached to the main casing 6 or not. Due to this, the air can easily be blown onto the ground surface.

As shown in FIG. 7, the distance from the reference plane P1 to the centers of gravity Gb1, Gb2 of each of the two batteries B is less than or equal to 1.5 times the width Wg of the main grip 14. In the above configuration, a position of the center of gravity Gp of the blower 2 can be suppressed from changing due to a change in the number of the batteries B. Due to this, the posture of the blower 2 can be stabilized when the operator holds the blower 2 by gripping the main grip 14.

As shown in FIG. 4, when the blower 2 is viewed along the rotation axis AX, the centers of gravity Gb1, Gb2 of each of the two batteries B are disposed on the discharge port 50 side relative to the main grip 14. In the above configuration, the weight of the two batteries B allows the center of gravity Gp of the blower 2 to be disposed on the discharge port 50 side relative to the main grip 14. Due to this, the discharge port 50 of the blower 2 is tilted in the direction along which the discharge port 50 faces the ground surface when the operator holds the blower 2 by gripping the main grip 14. Due to this, the air can easily be blown onto the ground surface.

As shown in FIG. 4, with respect to the direction in which the central axis of the main grip 14 extends, the front end of the main grip 14 is disposed on the discharge port 50 side relative to the rear end of the main grip 14. When the blower 2 is viewed along the rotation axis AX, the center of gravity Gm of the motor 54 is disposed on the front end side of the main grip 14 relative to the rear end of the main grip 14 and on the rear end side of the main grip 14 relative to the front end of the main grip 14. In general, the motor 54 is one of heavy-weight components among components constituting the blower 2. Due to this, the position of the center of gravity Gp of the blower 2 changes significantly according to a position where the motor 54 is disposed. In the above configuration, in viewing the blower 2 along the rotation axis AX, the center of gravity Gp of the blower 2 can be suppressed from being displaced far to the discharge port 50 from the one end of the main grip 14. Due to this, the posture of the blower 2 can be stabilized when the operator holds the blower 2 by gripping the main grip 14.

As shown in FIG. 1, the blower 2 further comprises the base member 16 fixed to the main casing 6. In the state where the blower 2 is placed on a placement plane such as a ground surface, only the base member 16 is in contact with the placement plane. In the above configuration, the base member 16 enables the blower 2 to be placed stably on the placement plane.

As shown in FIG. 2, the base member 16 comprises the sub grip 18 disposed radially outward of the rotation axis AX and configured to be gripped by the operator. When the blower 2 is viewed along the rotation axis AX, the center of gravity Gp of the blower 2 is disposed between the main grip 14 and the sub grip 18. When the operator holds the blower 2 so that the rotation axis AX becomes perpendicular to the placement plane such as the ground surface, the above configuration enables the operator to stably hold the blower 2 by gripping the main grip 14 and the sub grip 18.

The main casing 6 further includes the suction port 46 configured to supply air from outside of the blower 2 into the main casing 6. The air flows through the suction port 46 leftward. The two batteries B are attached to the main casing 6 by being slid in the right direction and are detached from the main casing 6 by being slid in the left direction. In the above configuration, when the operator holds the blower 2 by gripping the main grip 14 and the sub grip 18 so that the suction port 46 of the main casing 6 faces the ground surface, the batteries B are detached from the main casing 6 by being slid upward. Thus, the above configuration can suppress detachment of the two batteries B from the main casing 6 due to gravity acting on the batteries B.

The two batteries B may be electrically connected in series. The above configuration increases output of the blower 2.

The two batteries B may be electrically connected in parallel. The above configuration prolongs operating time of the blower 2.

In the present embodiment, the blower 2 comprises the motor 54, the fan 58, the main casing 6, the garbage bag 98, and the harness 118. The fan 58 is configured to rotate about the rotation axis AX by being driven by the motor 54. The main casing 6 includes the suction port 46 and the discharge port 50, and may be configured to flow the air from the suction port 46 to the discharge port 50 by the rotation of the fan 58. The garbage bag 98 is disposed downstream of the discharge port 50 in the airflow direction, and may be configured to collect the garbage flowing with the air. The harness 118 may be worn over the shoulder of the operator. As shown in FIG. 10, the harness 118 is connected to the front fastener 22 and the lower fastener 24 of the main casing 6 and the harness fastener 114 of the garbage bag 98. In this configuration, the harness 118 is worn over the shoulder of the operator while the operator is operating the blower 2. Further, the harness 118 is connected to the main casing 6 and the garbage bag 98. Due to this, even if the air flows into the garbage bag 98 while the operator is operating the blower 2, the garbage bag 98 can be suppressed from moving around.

Further, as shown in FIG. 10, the harness 118 includes the belt 120, the first connector 122, the second connector 124, and the third connector 126. The first connector 122 is disposed at the one end of the belt 120 in the longitudinal direction of the belt 120. The second connector 124 is disposed at the other end of the belt 120 in the longitudinal direction. The third connector 126 is disposed between the first connector 122 and the second connector 124 in the longitudinal direction. The first connector 122 is connected to the front fastener 22. The second connector 124 is connected to the lower fastener 24. The third connector 126 is connected to the harness fastener 114. In this configuration, the main casing 6 is connected to both ends of the harness 118 in the longitudinal direction, and the garbage bag 98 is connected to a position between the both ends of the harness 118. Due to this, the garbage bag 98 can further be suppressed from moving around even if the air flows into the garbage bag 98 while the operator is operating the blower 2.

Further, as shown in FIG. 4, in viewing the blower 2 along the rotation axis AX, the front fastener 22 and the lower fastener 24 are disposed at diagonal positions on the main casing 6. In this configuration, the blower 2 is held such that a direction of the rotation axis AX matches the vertical direction upon performing the work to collect garbage in the garbage bag 98. The above configuration enables the harness to stably hold the blower 2.

Further, as shown in FIG. 8, in viewing the blower 2 along the rotation axis AX, the distance from the virtual plane P4 passing through the front fastener 22 and the lower fastener 24 to the center of gravity Gp of the blower 2 is less than or equal to 0.4 times the distance between the front fastener 22 and the lower fastener 24. In this configuration, while garbage is collected in the garbage bag 98, the blower 2 is held such that the direction of the rotation axis AX matches the vertical direction. The above configuration suppresses the main casing 6 from rotating about a virtual line passing through the front fastener 22 and the lower fastener 24. Due to this, the blower 2 can be held stably by the harness 118.

Further, the harness fastener 114 is disposed on the downstream side of the garbage bag 98 in the airflow direction. In this configuration, when the harness fastener 114 is connected to the harness 118, the downstream side of the garbage bag 98 in the airflow direction is fixed relative to the harness 118. Due to this, the garbage bag 98 can further be suppressed from moving around even if the air flows into the garbage bag 98.

Further, the blower 2 may further comprise the flexible pipe 96 disposed between the discharge port 50 and the garbage bag 98 in the airflow direction. This configuration enables the operator to freely deflect the flexible pipe 96. Due to this, the operator can freely change the position of the garbage bag 98 according to his/her working posture.

Further, the garbage bag 98 includes the air relief 110 positioned on the downstream side of the garbage bag 98 in the airflow direction. The air relief 110 is configured to allow the air in the garbage bag 98 to escape to the outside. The air having flowed into the garbage bag 98 flows from the upstream side of the garbage bag 98 to the downstream side thereof, and flows out of the garbage bag 98 from the air relief 110. Due to this, excessive expansion of the garbage bag 98 can be suppressed, and the garbage flowing with the air to the garbage bag 98 can efficiently be collected.

Further, the fan 58 is a centrifugal fan configured to change the flow direction of the air from the direction extending along the rotation axis AX to the circumferential direction of the rotation axis AX. In this configuration, the air can be fed out in a direction different from an air suctioning direction.

Further, the blower 2 is a handheld blower. This configuration improves handling of the blower 2 by the operator.

Further, the motor 54 being the prime mover is a motor configured to operate by electric power supplied from a power source. In this configuration, vibration is small as compared to a configuration in which the prime mover is an engine. Due to this, the above configuration suppresses vibration transmitted to the operator through the harness 118 while the operator is operating the blower 2.

Further, the power source may be a plurality of batteries B configured to be attached to the main casing 6. In this configuration, the blower 2 can be used in work areas where an external power source does not exist.

Further, as shown in FIG. 8, in viewing the blower 2 along the left direction, the virtual plane P4 intersects both the virtual plane P9 and the virtual plane P10 between the front fastener 22 and the lower fastener 24. In this configuration, when the main grip 14 and the sub grip 18 are gripped to hold the blower 2 in the case of using the same in the air suctioning mode, the posture of the blower 2 can be stabilized.

(Corresponding Relationships)

The main casing 6 is an example of "volute casing". The right direction is an example of "first direction". The left direction is an example of "second direction". The front fastener 22 is an example of "first fastener", the lower fastener 24 is an example of "second fastener", and the harness fastener 114 is an example of "third fastener".

Second Embodiment

Figure 11:
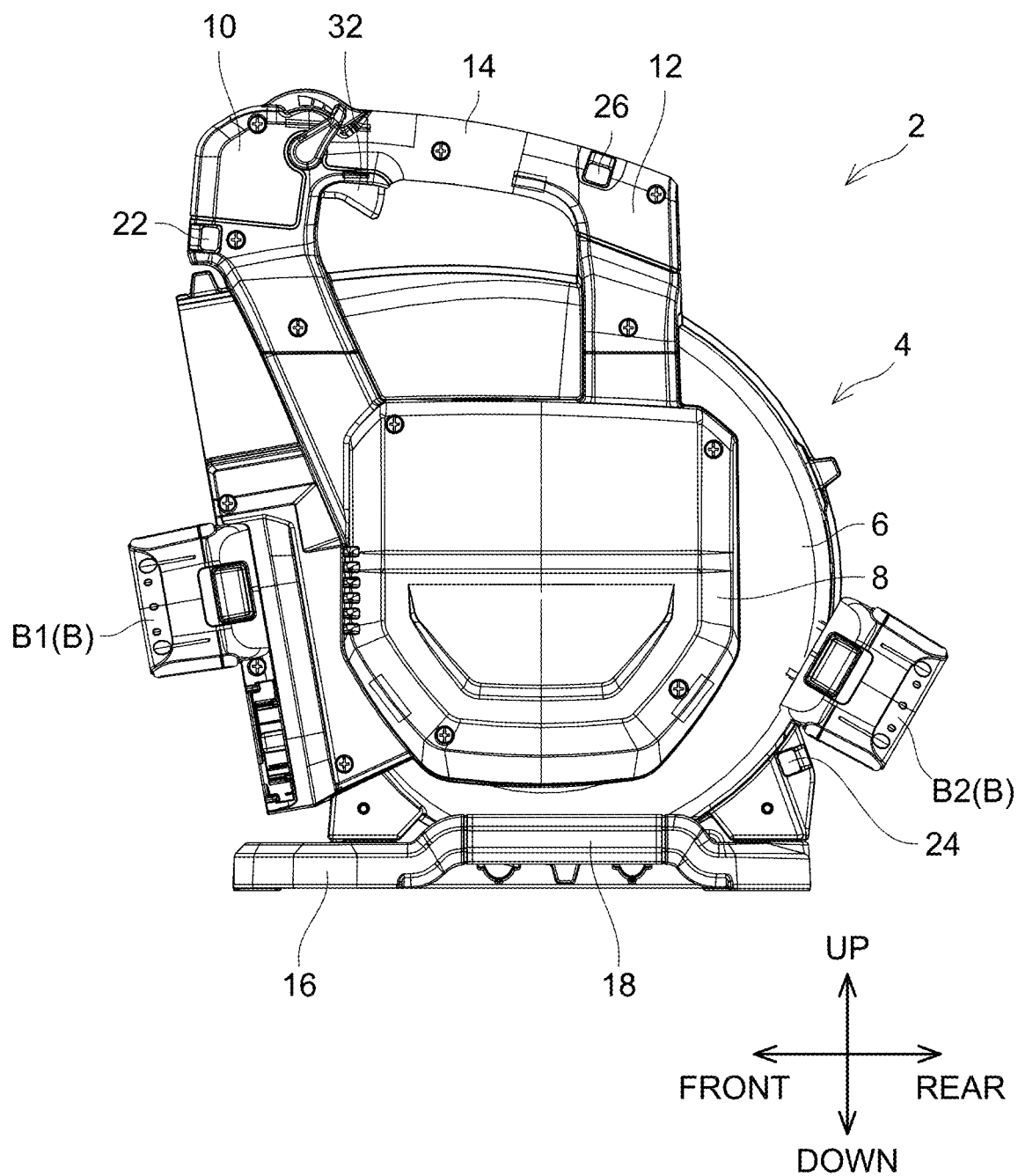
FIG. 11 is a left side view of a blower 2 of a second embodiment in an air supplying mode.

A blower 2 of a second embodiment will be described with reference to FIG. 11. For the second embodiment, differences from the first embodiment will be described, and description on similarities to the first embodiment will be omitted. In the second embodiment, the arrangement of the batteries B differs from the arrangement of the batteries B in the first embodiment. One battery B1 of the batteries B is attached to the front surface of the main casing 6. The other battery B2 of the batteries B is attached to the rear lower portion of the main casing 6. The battery B2 is disposed above the lower fastener 24. The battery B2 is attached to the main casing 6 by sliding the battery B2 in the right direction. Further, the battery B2 is detached from the main casing 6 by sliding the battery B2 in the left direction.

Third Embodiment

Figure 12:
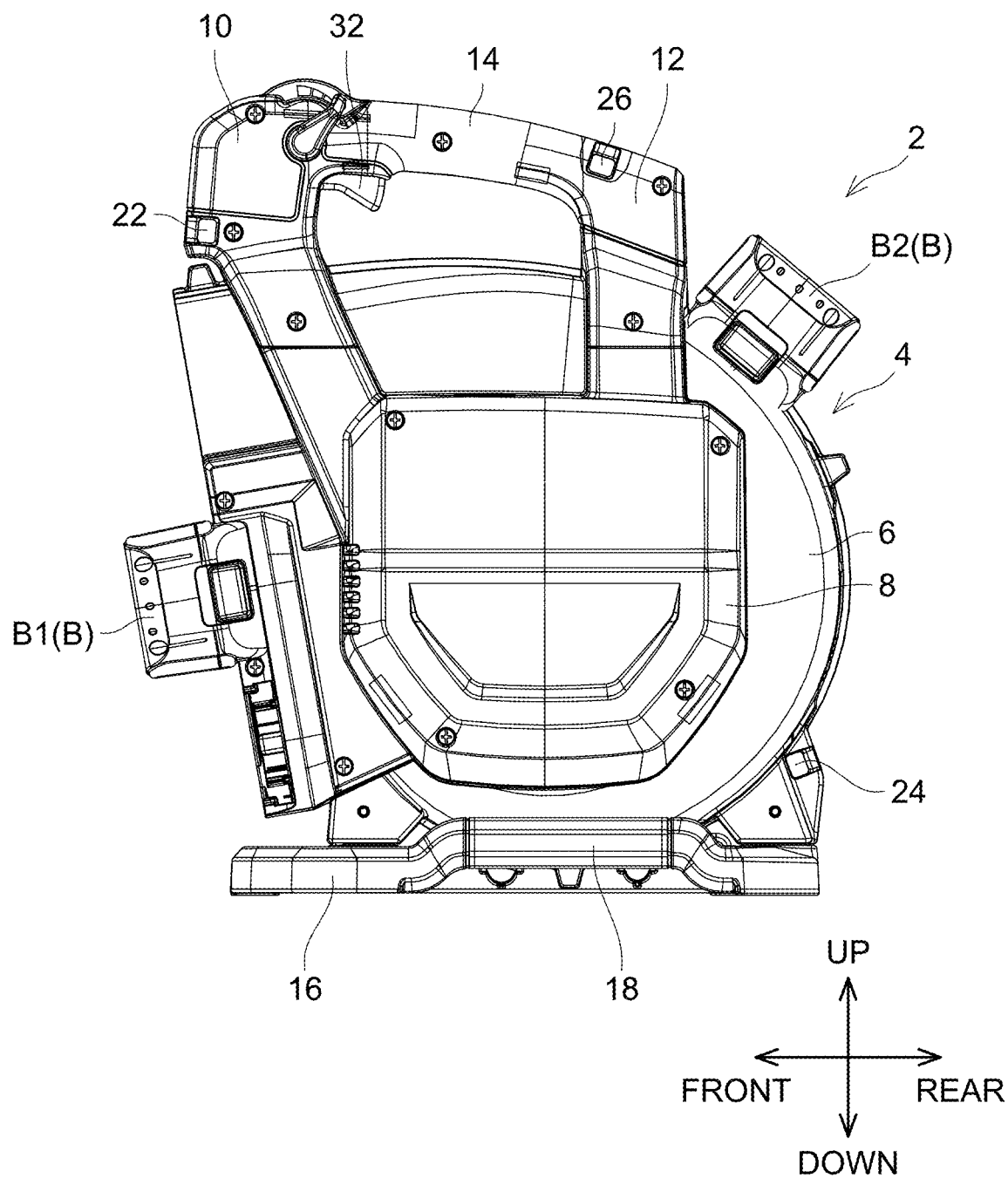
FIG. 12 is a left side view of a blower 2 of a third embodiment in an air supplying mode.

A blower 2 of a third embodiment will be described with reference to FIG. 12. For the third embodiment, differences from the first embodiment will be described, and description on similarities to the first embodiment will be omitted. In the third embodiment, the arrangement of the batteries B differs from the arrangement of the batteries B in the first embodiment. A battery B1 of the batteries B is attached to the front surface of the main casing 6. The other battery B2 of the batteries B is attached to the rear upper portion of the main casing 6. The battery B2 is attached to the main casing 6 by sliding the battery B2 in the right direction. Further, the battery B2 is detached from the main casing 6 by sliding the battery B2 in the left direction.

Fourth Embodiment

Figure 13:
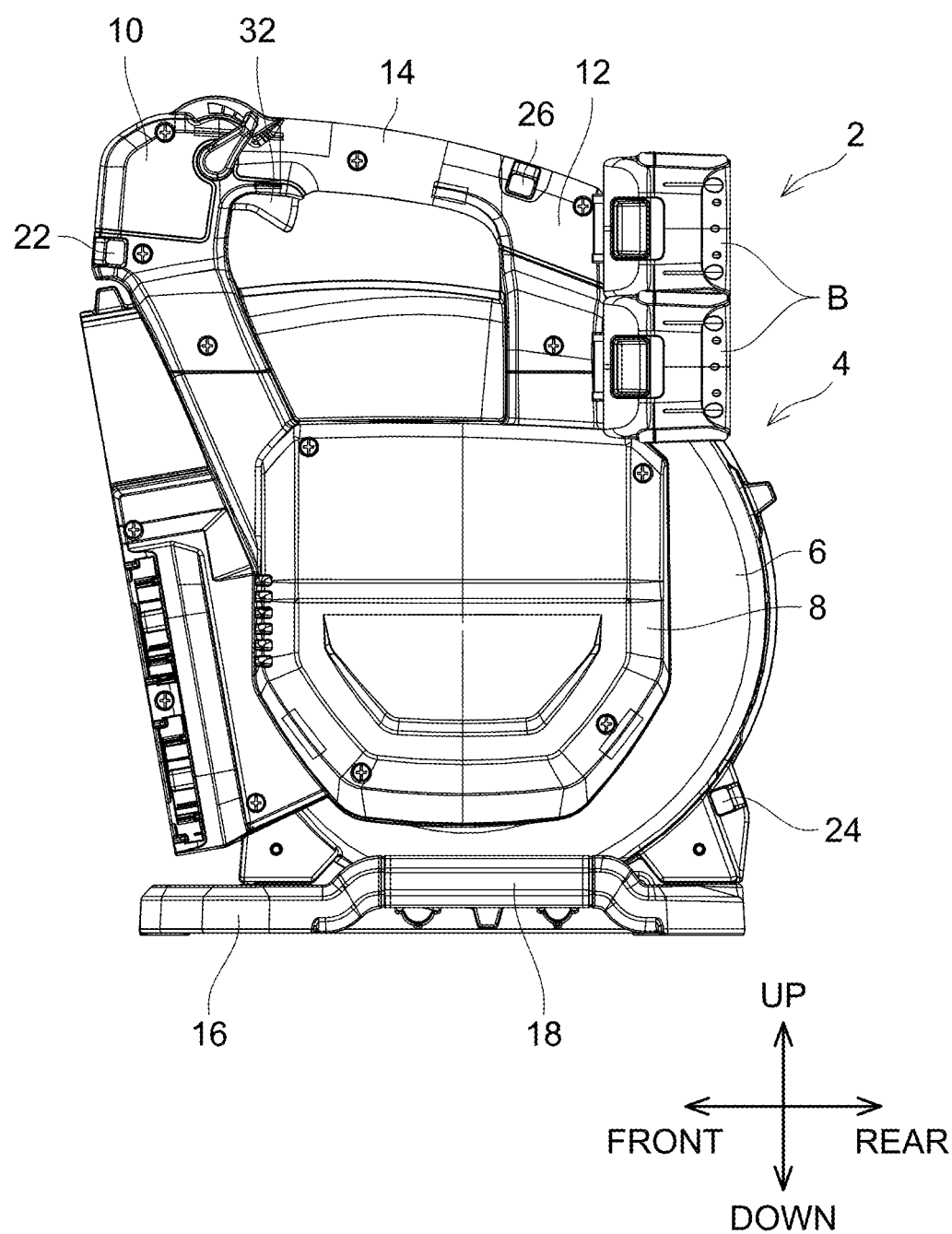
FIG. 13 is a left side view of a blower 2 of a fourth embodiment in an air supplying mode.

A blower 2 of a fourth embodiment will be described with reference to FIG. 13. For the fourth embodiment, differences from the first embodiment will be described, and description on similarities to the first embodiment will be omitted. In the fourth embodiment, the arrangement of the batteries B differs from the arrangement of the batteries B in the first embodiment. The two batteries B are attached to the rear upper portion of the casing 4, specifically, to a rear surface of the rear connecting section 12. The two batteries B are arranged along the up-down direction. The batteries B are attached to the rear connecting section 12 by sliding the batteries B in the right direction. Further, the batteries B are detached from the rear connecting section 12 by sliding the batteries B in the left direction.

Fifth Embodiment

Figure 14:
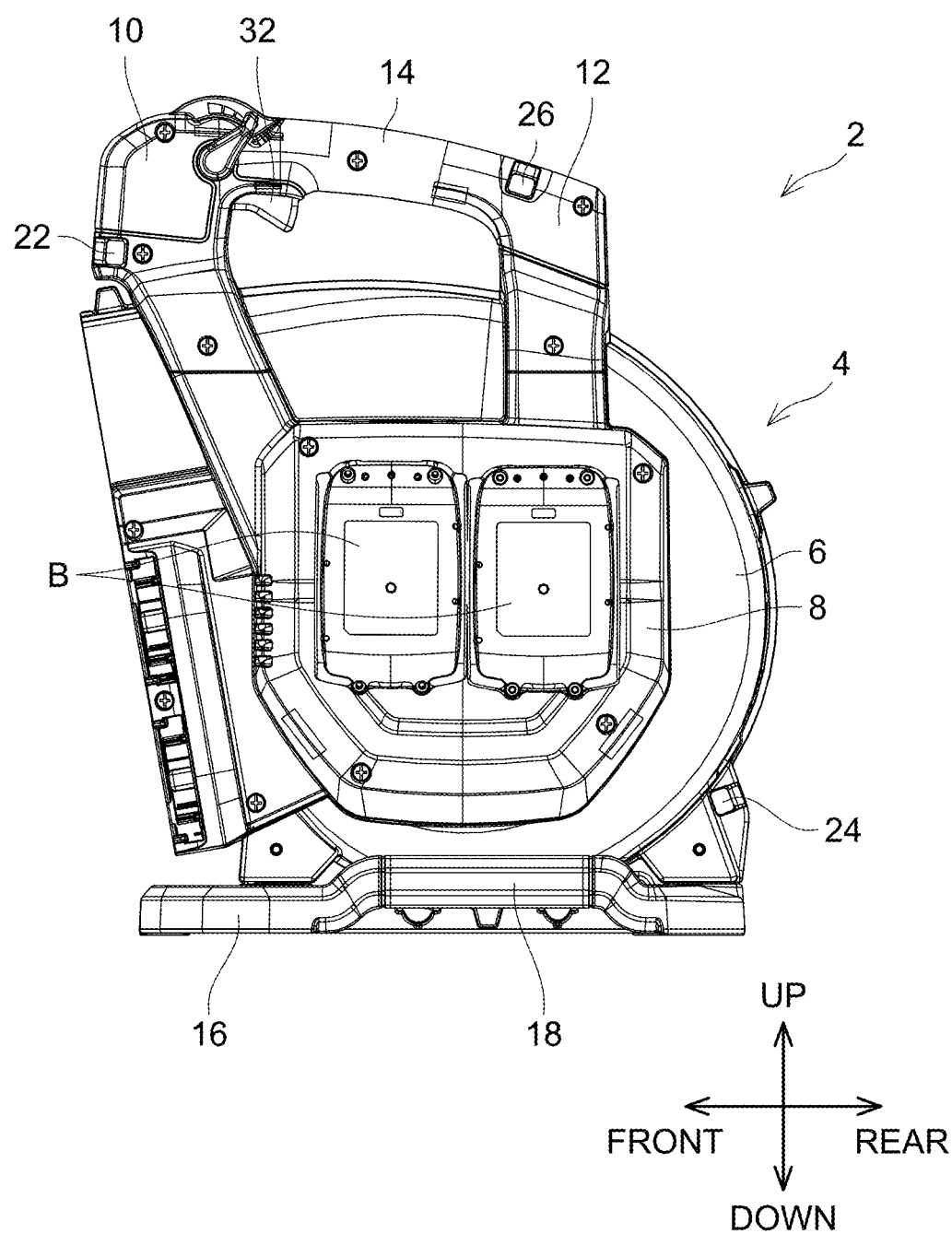
FIG. 14 is a left side view of a blower 2 of a fifth embodiment in an air supplying mode.

A blower 2 of a fifth embodiment will be described with reference to FIG. 14. For the fifth embodiment, differences from the first embodiment will be described, and description on similarities to the first embodiment will be omitted. In the fifth embodiment, the arrangement of the batteries B differs from the arrangement of the batteries B in the first embodiment. The two batteries B are attached to the side casing 8. The two batteries B are arranged along the front-rear direction. The batteries B are attached to the side casing 8 by sliding the batteries B downward. Further, the batteries B are detached from the side casing 8 by sliding the batteries B upward.

Sixth Embodiment

Figure 15:
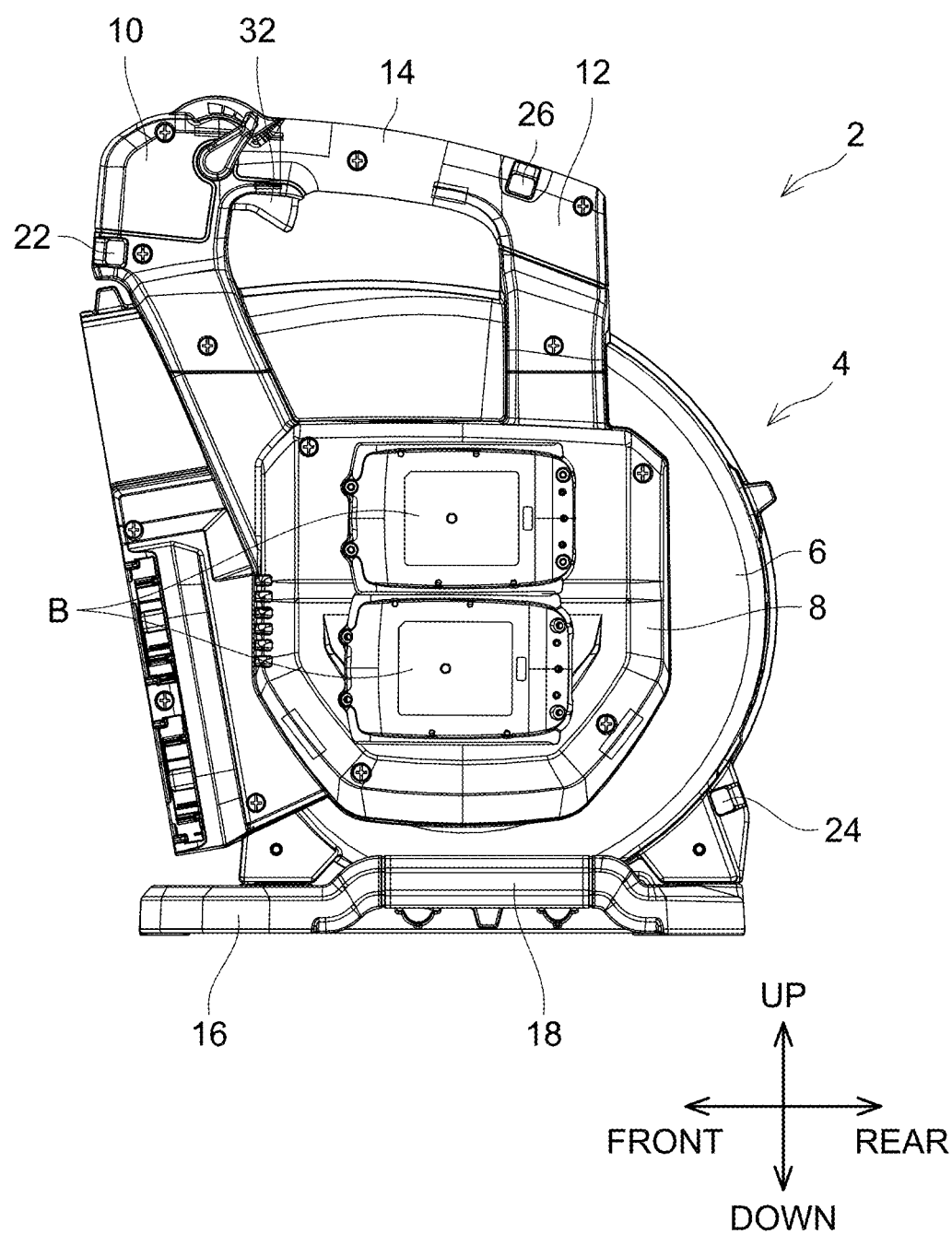
FIG. 15 is a left side view of a blower 2 of a sixth embodiment in an air supplying mode.

A blower 2 of a sixth embodiment will be described with reference to FIG. 15. For the sixth embodiment, differences from the first embodiment will be described, and description on similarities to the first embodiment will be omitted. In the sixth embodiment, the arrangement of the batteries B differs from the arrangement of the batteries B in the first embodiment. The two batteries B are attached to the side casing 8. The two batteries B are arranged along the up-down direction. The batteries B are attached to the side casing 8 by sliding the batteries B frontward. Further, the batteries B are detached from the side casing 8 by sliding the batteries B rearward.

Seventh Embodiment

Figure 16:
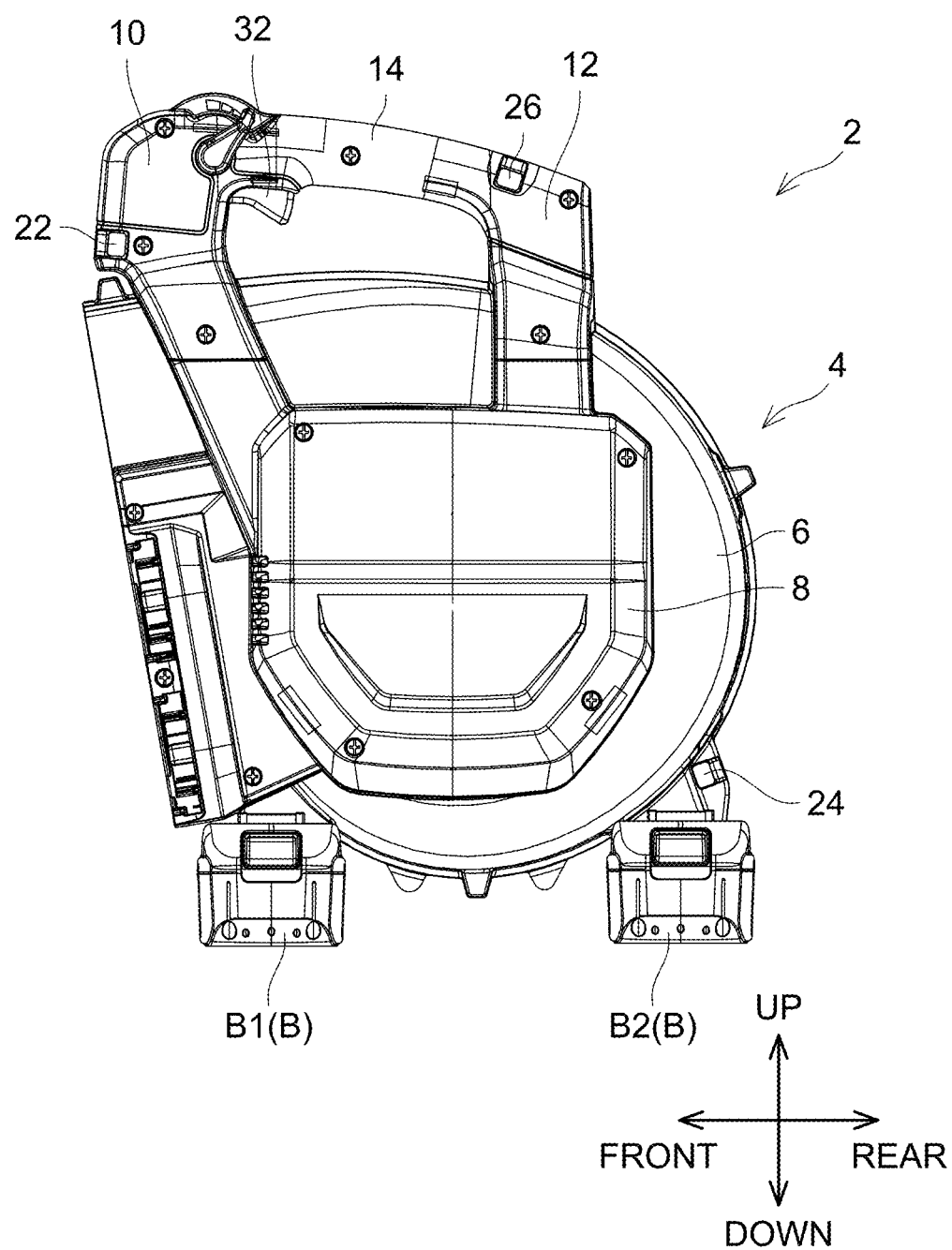
FIG. 16 is a left side view of a blower 2 of a seventh embodiment in an air supplying mode.

A blower 2 of a seventh embodiment will be described with reference to FIG. 16. For the seventh embodiment, differences from the first embodiment will be described, and description on similarities to the first embodiment will be omitted. In the seventh embodiment, the arrangement of the batteries B differs from the arrangement of the batteries B in the first embodiment. Further, in the seventh embodiment, the blower 2 does not comprise the base member 16 of the first embodiment. One of the batteries B is attached to the front lower portion of the main casing 6. The other of the batteries B is attached to the rear lower portion of the main casing 6. In the state where the blower 2 is placed on the placement plane such as the ground surface, only the two batteries B are in contact with the placement plane. Due to this, the blower 2 can be placed on the placement plane by the two batteries B without another member. The battery B is attached to the main casing 6 by sliding the battery B in the right direction. Further, the battery B is detached from the main casing 6 by sliding the battery B in the left direction.

The plurality of batteries B in one or more embodiments may be used not only in the blower 2 but also in other power tools such as a chain saw and a hedge trimmer.

The number of the batteries B in one or more embodiments may be three or more.

The blower 2 in one or more embodiments may not comprise the base member 16. In this case, the main casing 6 may be in contact with the placement plane in the state where the blower 2 is placed on the placement plane.

In the harness 118 in one or more embodiments, the first connector 122 may be connected to the front fastener 22, the second connector 124 may be connected to the harness fastener 114, and the third connector 126 may be connected to the lower fastener 24.

In one or more embodiments, in the view of the blower 2 along the rotation axis AX, the center of gravity Gp of the blower 2 may be disposed on the virtual plane P4 passing through the front fastener 22 and the lower fastener 24.

The harness fastener 114 in one or more embodiments may be disposed on an upstream side of the garbage bag 98 in the airflow direction.

The garbage bag 98 in one or more embodiments may not include the air relief 110. In this case, the fabric of the garbage bag 98 may be fabricated with a loose weave to allow the air to flow out from an entirety of the garbage bag 98.

What is claimed is:
1. A blower, comprising:
 a plurality of batteries;
 a motor configured to operate by electric power supplied from the plurality of batteries;
 a centrifugal fan configured to rotate about a rotation axis by being driven by the motor and configured to change a flow direction of air from a first direction extending along the rotation axis to a radially outward direction of the rotation axis;

a volute casing including a discharge port and configured to guide the air from the centrifugal fan along a circumferential direction of the rotation axis to the discharge port; and a main grip disposed radially outward of the rotation axis and outside of the volute casing and configured to be gripped by an operator, wherein a central axis of the main grip extends along a reference plane perpendicular to the rotation axis, a distance from the reference plane to a center of gravity of the blower is less than or equal to 1.5 times a width of the main grip, and when the blower is viewed along the rotation axis, the center of gravity of each of the plurality of batteries is disposed on a discharge port side relative to the main grip.

2. The blower according to claim 1, wherein when the blower is viewed along the rotation axis, the center of gravity of the blower is disposed on a discharge port side relative to the main grip.

3. The blower according to claim 1, wherein a distance from the reference plane to a center of gravity of each of the plurality of batteries is less than or equal to 1.5 times the width of the main grip.

4. The blower according to claim 1, wherein with respect to a direction in which the central axis extends, one end of the main grip is disposed on a discharge port side relative to another end of the main grip, and when the blower is viewed along the rotation axis, a center of gravity of the motor is disposed on the other end side relative to the one end of the main grip and on a one end side relative to the other end of the main grip.

5. The blower according to claim 1, further comprising a base member fixed to the volute casing, wherein in a state where the blower is placed on a placement plane, only the base member is in contact with the placement plane.

6. The blower according to claim 5, wherein the base member comprises a sub grip disposed radially outward of the rotation axis and configured to be gripped by the operator, and when the blower is viewed along the rotation axis, the center of gravity of the blower is disposed between the main grip and the sub grip.

7. The blower according to claim 6, wherein the volute casing further includes a suction port configured to supply air from outside of the blower into the volute casing, the air flows through the suction port in the first direction, and the plurality of batteries is attached to the volute casing by being slid in a second direction that is opposite to the first direction and is detached from the volute casing by being slid in the first direction.

8. The blower according to claim 1, wherein the batteries are electrically connected in series.

9. The blower according to claim 1, wherein the batteries are electrically connected in parallel.

10. A blower, comprising:

a plurality of batteries;

a motor configured to operate by electric power supplied from the plurality of batteries;

a centrifugal fan configured to rotate about a rotation axis by being driven by the motor and configured to change a flow direction of air from a first direction extending along the rotation axis to a radially outward direction of the rotation axis;

a volute casing including a discharge port and configured to guide the air from the centrifugal fan along a circumferential direction of the rotation axis to the discharge port; and a main grip disposed radially outward of the rotation axis and outside of the volute casing and configured to be gripped by an operator, wherein a central axis of the main grip extends along a reference plane perpendicular to the rotation axis, a distance from the reference plane to a center of gravity of the blower is less than or equal to 1.5 times a width of the main grip, with respect to a direction in which the central axis extends, one end of the main grip is disposed on a discharge port side relative to another end of the main grip, and when the blower is viewed along the rotation axis, a center of gravity of the motor is disposed on the other end side relative to the one end of the main grip and on a one end side relative to the other end of the main grip.

11. The blower according to claim 10, wherein when the blower is viewed along the rotation axis, the center of gravity of the blower is disposed on a discharge port side relative to the main grip.

12. The blower according to claim 10, wherein a distance from the reference plane to a center of gravity of each of the plurality of batteries is less than or equal to 1.5 times the width of the main grip.

13. The blower according to claim 10, further comprising a base member fixed to the volute casing, wherein in a state where the blower is placed on a placement plane, only the base member is in contact with the placement plane.

14. The blower according to claim 13, wherein the base member comprises a sub grip disposed radially outward of the rotation axis and configured to be gripped by the operator, and when the blower is viewed along the rotation axis, the center of gravity of the blower is disposed between the main grip and the sub grip.

15. The blower according to claim 14, wherein the volute casing further includes a suction port configured to supply air from outside of the blower into the volute casing, the air flows through the suction port in the first direction, and the plurality of batteries is attached to the volute casing by being slid in a second direction that is opposite to the first direction and is detached from the volute casing by being slid in the first direction.

16. A blower, comprising:

a plurality of batteries;

a motor configured to operate by electric power supplied from the plurality of batteries;

a centrifugal fan configured to rotate about a rotation axis by being driven by the motor and configured to change a flow direction of air from a first direction extending along the rotation axis to a radially outward direction of the rotation axis;

a volute casing including a discharge port and configured to guide the air from the centrifugal fan along a circumferential direction of the rotation axis to the discharge port; and a main grip disposed radially outward of the rotation axis and outside of the volute casing and configured to be gripped by an operator, wherein a central axis of the main grip extends along a reference plane perpendicular to the rotation axis, a distance from the reference plane to a center of gravity of the blower is less than or equal to 1.5 times a width of the main grip, the blower further comprises a base member fixed to the volute casing, in a state where the blower is placed on a placement plane, only the base member is in contact with the placement plane, the base member comprises a sub grip disposed radially outward of the rotation axis and configured to be gripped by the operator, and when the blower is viewed along the rotation axis, the center of gravity of the blower is disposed between the main grip and the sub grip.

17. The blower according to claim 16, wherein the volute casing further includes a suction port configured to supply air from outside of the blower into the volute casing, the air flows through the suction port in the first direction, and the plurality of batteries is attached to the volute casing by being slid in a second direction that is opposite to the first direction and is detached from the volute casing by being slid in the first direction.

18. The blower according to claim 16, wherein when the blower is viewed along the rotation axis, the center of gravity of the blower is disposed on a discharge port side relative to the main grip.

19. The blower according to claim 16, wherein a distance from the reference plane to a center of gravity of each of the plurality of batteries is less than or equal to 1.5 times the width of the main grip.

* * * * *